US012253058B2

(12) United States Patent
Foster et al.

(10) Patent No.: US 12,253,058 B2
(45) Date of Patent: Mar. 18, 2025

(54) DRIVE ASSEMBLY

(71) Applicant: Marine Power Systems Limited, Swansea (GB)

(72) Inventors: Graham Foster, Swansea (GB); John Chapman, Swansea (GB); Ashley Norman, Swansea (GB)

(73) Assignee: Marine Power Systems Limited, Swansea (GB)

( * ) Notice: Subject to any disclaimer, the term of this patent is extended or adjusted under 35 U.S.C. 154(b) by 95 days.

(21) Appl. No.: 17/635,640

(22) PCT Filed: Aug. 28, 2020

(86) PCT No.: PCT/GB2020/052075
§ 371 (c)(1),
(2) Date: Feb. 15, 2022

(87) PCT Pub. No.: WO2021/038248
PCT Pub. Date: Mar. 4, 2021

(65) Prior Publication Data
US 2022/0290647 A1    Sep. 15, 2022

(30) Foreign Application Priority Data

Aug. 30, 2019 (GB) ..................... 1912525

(51) Int. Cl.
*F03B 13/18* (2006.01)
*B63B 21/50* (2006.01)
*B63B 35/44* (2006.01)

(52) U.S. Cl.
CPC .............. *F03B 13/18* (2013.01); *B63B 21/50* (2013.01); *B63B 35/44* (2013.01); *B63B 2035/4466* (2013.01); *F05B 2220/706* (2013.01)

(58) Field of Classification Search
CPC .......... F03B 13/18; F03B 13/20; F03B 13/10; F03B 13/16; B63B 21/50; B63B 35/44;
(Continued)

(56) References Cited

U.S. PATENT DOCUMENTS

2011/0042954 A1* 2/2011 Werjefelt ................ F03B 13/20
290/53

FOREIGN PATENT DOCUMENTS

CN          106593756 A       4/2017
CN          111042978 B  *  12/2020    ............. B63B 35/44
(Continued)

OTHER PUBLICATIONS

European Patent Office , "Communication pursuant to Article 94(3) EPC", European Patent Office, Communication pursuant to Article 94(3) EPC, Feb. 20, 2023, pp. 1-5, 5 pages.
(Continued)

*Primary Examiner* — Joseph Ortega
(74) *Attorney, Agent, or Firm* — Blanchard Horton PLLC

(57) ABSTRACT

A drive assembly is provided suitable for aiding in the conversion of wave energy to useful energy. The drive assembly of the present invention is arranged to transfer wave energy to an energy converter, the drive assembly comprising a wave energy capturing member; and a lever arm coupled to the wave energy capturing member, the lever arm being movable between a first stroke position and a second stroke position to define a working stroke; wherein the lever arm is arranged to be coupled to an energy converter and is further arranged to transfer energy from the wave energy capturing member to said energy converter; further wherein the wave energy capturing member is arranged to move the lever arm between the first stroke position and the second stroke position; and wherein the first stroke position and the second stroke position define distal
(Continued)

end points of the working stroke; the working stroke arranged so as to drive said energy converter.

15 Claims, 21 Drawing Sheets

(58) Field of Classification Search
CPC ....... B63B 2035/4466; F05B 2220/706; F05B 2250/72; F05B 2260/406; Y02E 10/30
See application file for complete search history.

(56) References Cited

FOREIGN PATENT DOCUMENTS

| | | | |
|---|---|---|---|
| GB | 1542251 | 3/1979 | |
| GB | 2565333 A | 2/2019 | |
| WO | WO-2009109701 A1 * | 9/2009 | .......... F03B 13/1815 |
| WO | 2012001646 A1 | 1/2012 | |
| WO | 2019030534 A1 | 2/2019 | |

OTHER PUBLICATIONS

Di Renzo, Raffaele, "International Search Report for PCT/GB2020/052075", Oct. 2, 2020, 11 pages.
Chinese Patent Office, "First Examination Opinion", Shenzhen Layer Shenzhen Zhongyi United Intellectual Property Agency Co., Ltd., Application No. 202800703852, Oct. 31, 2023, 17.

* cited by examiner

DRIVE ASSEMBLY

FIELD OF THE INVENTION

The present invention relates to a drive assembly, in particular a drive assembly for use in transferring wave energy to an energy converter.

BACKGROUND TO THE INVENTION

In recent years, there has been increased emphasis on the need to exploit renewable energy so that it significantly contributes to global energy production. A combination of government targets, media representation of the issues associated with non-renewable energy sources, and ever increasing energy costs have all created a powerful driving force for the development of renewable energy systems.

Negative impacts of fossil fuels on the environment are well known, as are the problems and high costs associated with nuclear energy. Harnessing of the huge natural abundance of renewable energy on the other hand is constrained merely by our capability of capturing and supplying it at an economically viable price.

One potential renewable energy source is wave power—an abundant and consistent energy resource available in all of the world's large oceans and seas. Various wave devices for generating energy from wave power have been proposed, but such devices have many limitations with no one device having the proven ability to reliably exploit the available wave power resource over the long term.

There are disclosed in WO2010007418, WO2011158006 and WO2013068748 successively improved generators for converting wave motion to useful energy. The generators disclosed use a submersible reaction body to solve many of the difficulties associated with existing wave energy converters.

However, the wave energy converters disclosed in WO2010007418, WO2011158006 and WO2013068748 still have potential for further improvement.

SUMMARY OF THE INVENTION

In accordance with the invention, a drive assembly and buoyant wave energy converting apparatus are provided as outlined in the accompanying claims. The drive assembly comprises a lever arm arranged to transfer wave energy captured by a wave energy capturing member to a wave energy converter. The lever arm, an end thereof or a portion thereof, is arranged to move between a first position and a second position defining a working stroke, the working stroke arranged to drive said energy converter. The movement may be achieved by rotation of a rigid such lever arm about a fixed point, or by flexion of a flexible such lever arm, or any suitable combination of both. In embodiments wherein the rotation is achieved by flexion of a flexible such lever arm, the lever arm may be biased toward one of the first or second position on the rotation arc, said biasing providing a means of storing elastic potential energy by the lever arm.

In accordance with a first aspect of the present invention, there is provided a drive assembly arranged to transfer wave energy to an energy converter, the drive assembly comprising, a wave energy capturing member; and a lever arm coupled to the wave energy converting member, the lever arm being movable between a first stroke position and a second stroke position to define a working stroke; wherein the lever arm is arranged to be coupled to an energy converter and is further arranged to transfer energy from the wave energy capturing member to said energy converter; further wherein the wave energy capturing member is arranged to move the lever arm between the first stroke position and the second stroke position; and wherein the first stroke position and the second stroke position define distal end points of the working stroke; the working stroke arranged so as to drive said energy converter.

The present invention preferably provides a drive assembly suitable for use with a wave energy converting apparatus. The drive assembly of the present invention is used in capturing wave power, the energy capturing member preferably comprising a wave-energy capturing float. In such embodiments, the wave energy capturing member is preferably enabled to move in a reciprocal motion according to the movement of waves, thereby permitting the transfer of energy to a said energy converter by moving the lever arm, optionally by way of an actuating member coupling the wave energy capturing member to the lever arm. Movement of the lever arm between the first stroke position and the second stroke position as a result of said movement of the wave energy capturing member defines the working stroke. Any optional actuating member is preferably coupled to the lever arm at a point along the length of the lever arm.

The wave energy capturing member preferably moves in a body of water in accordance with waves within said body of water, thus capturing the energy of said waves. Said movement is preferably translated from the wave energy capturing member to the lever arm by way of the actuating member coupled therebetween, the actuating member actuating the lever arm such that the lever arm is moved between the first stroke position and the second stroke position. The lever arm is preferably coupled to an energy converter such that movement between the first stroke position and the second stroke position constitutes, or comprises, a working stroke of said energy converter. The drive assembly may, in some embodiments, comprise said energy converter. The energy converter is preferably arranged to convert wave energy captured by the wave energy capturing member and transferred to the energy converter by way of the lever arm (and optionally by way of an actuating member), to useful energy, which may be electrical energy.

The term "lever arm" in the context of the present invention will be understood to be any elongate structure arranged to move; pivot or rotate about a fulcrum; or bend or flex such that a portion or end thereof moves between the first stroke position and the second stroke position. The lever arm may, in some embodiments, comprise a frame having one or more structural elements, the frame forming a reticulated frame or a skeletal frame. In other embodiments, the lever arm may comprise a single elongate lever element. The lever arm will be appreciated to have a level of inherent rigidity such that a force exerted upon a point of the lever arm by the actuating member causes the lever arm to rotate or pivot about the fulcrum. The lever arm may comprise an elastic property permitting the lever arm to store elastic potential energy when a force is exerted thereon by the actuating member. Said elastic energy may be used to bias the lever arm toward a biased position, which may be the first stroke position or the second stroke position, or one distal end of the working stroke. Said preferable inherent biasing quality of the lever arm may permit effective return of the lever arm to said biased position, in preparation for receiving a force exerted thereon (wave energy transfer) by the wave energy capturing member (optionally by way of an actuating member). The preferable biasing quality of the lever arm preferably biases the lever arm to the biased position to enable the continued driving of a said energy converter. In certain embodiments the lever arm also preferably defines a neutral position of the working stroke that is defined by the degree to which a force in the wave energy capturing member impinges upon the lever arm (by way of the actuating member) (i.e. when there are no wave induced forces moving the wave energy capturing member). Therefore the working stroke can be positive or negative about the neutral position along a movement arc of the lever arm.

In some preferable embodiments, the movement of the lever arm by the wave energy capturing member occurs by way of rotation of the lever arm about a fulcrum to define a rotation arc; and/or by way of flexion of at least a portion of the lever arm. In some embodiments wherein the movement occurs by flexion of the lever arm, the lever arm is preferably arranged to store elastic potential energy in the range of 5 to 50 MJ in response to said movement by the wave energy capturing member.

In some embodiments, the lever arm is coupled to the wave energy capturing member by way of an actuating member arranged to transfer energy from the wave energy capturing member. Preferably the actuating member comprises at least one selected from: a flexible rope; a rigid frame. The actuating member preferably provides an intermediary energy transfer connection between the energy capturing member and the lever arm. In embodiments wherein the actuating member comprises a flexible rope, the flexible rope may comprise an adjustable rope length. The adjustable rope length preferably defines a freely adjustable distance between the energy capturing member and the lever arm. Embodiments will be appreciated wherein the rope length may be adjusted in addition to, or instead of, rotation or movement of the lever arm. The rope length may be adjustable, in preferable embodiments, by a winch.

In embodiments wherein the actuating member comprises a rigid frame, the rigid frame may be coupled to the lever arm by a hinge, such that the rigid frame is rotatable relative to the lever arm about an axis defined by said hinge. The hinge may comprise a bearing, which may be any suitable bearing, such as a ball bearing or journal bearing. The rigid frame may be coupled to the energy capturing member by a hinge. Said coupling to the energy capturing member may be at an end of the rigid frame opposing an end of the rigid frame coupled to the lever arm. The rigid frame is therefore preferably arranged to move relative to the lever arm such that energy may be transferred from the energy capturing member to the rigid frame. The rigid frame of the actuating member may be any suitable frame structure and is preferably a reticulated or skeletal frame, such that resistance to a flow of a fluid therethrough is minimised.

The energy capturing member preferably comprises a buoyant portion. The energy capturing member thereby preferably comprises a float. The float may in some preferable embodiments be substantially spherical, ellipsoid or ovoid in shape. The float may alternatively be substantially cylindrical or barrel-shaped. Embodiments will be appreciated wherein the energy capturing member may be any shape suitable for capturing wave energy and transferring said energy to the lever arm by way of the actuating member.

The drive assembly is preferably arranged to be mounted onto a buoyant platform. The buoyant platform preferably comprises a frame structure such that resistance against flow of fluid through said frame structure is minimised. As such, said frame structure may comprise, in some embodiments, a reticulated or skeletal frame. The buoyant platform preferably comprises an upper surface arranged to support the drive assembly. The buoyant platform preferably further comprises a buoyant portion, which may be positioned adjacent a lowermost surface of the frame structure. Alternatively, or additionally, the buoyant portion may be positioned adjacent one or more pairs of opposing sides or corners of the frame structure. In most preferable embodiments, the positioning of the buoyant portion acts to provide minimal resistance to the flow of fluid through or adjacent the buoyant platform. In the context of the present invention, it will be understood that the term "flow of fluid" used herein, may refer to flow of air during floatation or transport of said buoyant platform or frame atop a surface of a body of water, and may additionally refer to flow of water during submersion of the buoyant platform or frame in a body of water.

The wave energy capturing member is preferably positioned at a height relative to an upper surface of the buoyant platform, wherein the height is preferably adjustable. The lever arm is arranged to move, for example along a movement arc of the lever arm, to adjust the height between an in-use height and a docked height, the in-use height being greater than the docked height. The in-use height is preferably a height at which the wave energy capturing member is arranged to capture wave energy. The in-use height is preferably selected from between: 5.0 m to 40.0 m. The docked height is preferably a height at which the wave energy capturing member does not capture wave energy. The docked height may be a height such that the wave energy capturing member is adjacent or proximate the buoyant platform. It will be appreciated that the height may be adjusted to any height between the in-use height and the docked height, and that the in-use height may be determined according to conditions of a body of water, such as sea, ocean or weather conditions. The in-use height may be controlled or determined according to a distance between the wave energy capturing member and a surface of a body of water, such that the in-use height defines an in-use depth of the wave energy capturing member relative to the surface of the body of water.

The adjustment of the height by the lever arm is preferably independent of the working stroke. Adjustment of the height by the lever arm through movement of the lever arm along a movement arc of the lever arm is preferably achieved independently of movement of the lever arm between the first stroke position and the second stroke position. The first stroke position and the second stroke position are, in said preferable embodiments, therefore defined according to a stroke distance spaced therebetween, said stroke distance being irrespective of the position of the lever arm on the movement arc. Therefore, movement between the first stroke position and the second stroke position, and thus performance of the working stroke, is preferably independent of the position of the lever arm on the movement arc. The movement arc may therefore define a total movement distance which is greater than the stroke distance, such that the working stroke may be performed within the movement scope of the movement arc at different points thereon. In such embodiments, the lever arm may be moved to reduce the height of the energy capturing member relative to the buoyant platform, irrespective of any simultaneous energy transfer from the energy capturing member to the lever arm, which may be via an actuating member, and thus simultaneous movement of the lever arm between the first stroke position and the second stroke position. Said energy converter is preferably coupled to the lever arm at a point along the length of said lever arm. The stroke distance is preferably measured as a straight linear distance of travel of said coupling point between the first stroke position and the second stroke position. The stroke distance may, in alternative embodiments, be a curvilinear distance of travel of said coupling point along the movement arc between the first stroke position and the second stroke position. The stroke distance is preferably selected from the range: 2.0 m to 20.0 m, and is more preferably selected from the range: 5.0 m to 15.0 m.

The drive assembly preferably comprises a plurality of actuating members, each coupled to the wave energy capturing member, and each further coupled to a corresponding lever arm. In preferable embodiments, the drive assembly comprises four flexible rope actuating members each coupled to a common wave energy capturing member, each flexible rope actuating member being further coupled to a corresponding lever arm. In other preferable embodiments, the drive assembly comprises two rigid frame actuating members each pivotably coupled to a common wave energy capturing member, each rigid frame actuating member being further pivotably coupled to a corresponding lever arm. In such preferable embodiments, the corresponding lever arms may each be coupled to the buoyant platform at distinct pivot points on the buoyant platform, each defining a separate fulcrum about which the lever arms may individually rotate. Alternatively, the corresponding lever arms may be coupled to the buoyant platform at a common pivot point on the buoyant platform, defining a single fulcrum about which the lever arms may collectively rotate.

Preferably the energy converter comprises one selected from the range: a rotational generator; a linear generator; a hydraulic pump.

In accordance with a second aspect of the present invention, there is provided a buoyant wave energy converting apparatus, the apparatus comprising: a drive assembly arranged to transfer wave energy to an energy converter, the drive assembly comprising, a wave energy capturing member; and a lever arm coupled to the wave energy capturing member, the lever arm being movable between a first stroke position and a second stroke position to define a working stroke; wherein the lever arm is arranged to be coupled to an energy converter and is further arranged to transfer energy from the wave energy capturing member to said energy converter; further wherein the wave energy capturing member is arranged to move the lever arm between the first stroke position and the second stroke position; and wherein the first stroke position and the second stroke position define distal end points of the working stroke; the working stroke arranged so as to drive said energy converter.

It will be appreciated that the drive assembly comprised within the buoyant wave energy converting apparatus of the second aspect may comprise any of the features of the drive assembly of the first aspect.

The apparatus preferably further comprises a buoyant platform arranged to support the drive assembly. It will be appreciated that the buoyant platform discussed for use with the first aspect, may comprise any feature of the buoyant platform of the second aspect.

Preferably the wave energy capturing member is positioned at a height relative to an upper surface of the buoyant platform. The lever arm is preferably arranged to move to adjust the height between an in-use height and a docked height, the in-use height being greater than the docked height. The adjustment of the height by the lever arm is preferably independent of the working stroke.

The buoyant platform preferably comprises an in-use configuration in which the buoyant platform is submerged in a body of water, and wherein the lever arm is preferably positioned on the movement arc such that the wave energy capturing member is positioned at the in-use height. Preferably at the in-use height, the wave energy capturing member is submerged in the body of water. In the in-use configuration, the buoyant platform is preferably suspended at a submerged depth beneath the surface of the body of water by a mooring means, such that vertical buoyancy forces provided by the buoyancy of the buoyant platform are counteracted by opposing vertical anchoring forces provided by the mooring means, such that the buoyant platform is vertically stabilised in the body of water such that movement of the buoyant platform in the in-use configuration is minimised. It will be appreciated that sub-surface currents or waves may interact with the buoyant platform to provide lateral forces to the buoyant platform. In some preferable embodiments the mooring means preferably additionally provides angled mooring forces (appreciated as contrasting to directly vertical forces) opposing a component of said lateral forces such that the buoyant platform is also laterally stabilised in the body of water.

Preferably the buoyant platform comprises a storm configuration in which the buoyant platform, and preferably the wave energy capturing member, is submerged in a body of water, and preferably wherein the lever arm is positioned on the movement arc such that the wave energy capturing member is positioned at the docked height. In the storm configuration, the buoyant platform is submerged similar to that discussed for the in-use configuration. Adjusting the height of the wave energy capturing member relative to the buoyant platform such that the wave energy capturing member is positioned at the docked height during the storm configuration preferably reduces or minimises damaging forces exerted upon the wave energy capturing member by rough or turbulent sea conditions. The storm configuration thereby preferably provides for improved longevity of a drive assembly or buoyant wave energy converting apparatus according to the present invention. A storm configuration may, in some embodiments, comprise the buoyant platform and the wave energy capturing apparatus positioned submerged in the body of water, and wherein an orientation of the wave energy capturing member is adjusted to minimise hydrodynamic drag of the wave energy capturing member. For example, in embodiments wherein the wave energy capturing member comprises a long axis, for example of a cylindrical wave energy capturing member, the storm configuration may comprise the wave energy capturing member oriented such that the long axis is positioned parallel to a direction of waves.

Preferably the buoyant platform comprises a transport configuration in which the buoyant platform is floating on a surface of a body of water, and wherein the wave energy capturing member is positioned at the docked height. In the transport configuration, the lever arm is preferably moved, rotated or pivoted about the fulcrum to a first distal end of a movement arc of the lever arm, such that the lever arm is preferably oriented approximately perpendicular to the upper surface of the buoyant platform. In embodiments wherein the lever arm is flexible relative to the buoyant platform, the lever arm may be at a biased position in the transport configuration. It will be appreciated that the orientation of the lever arm is determined according to the longitudinal axis of the lever arm. Therefore, in embodiments wherein the lever arm is a frame composed of one or more structural elements, which may form a reticulated or skeletal frame of the lever arm, the orientation of the lever arm will be understood to be the longitudinal axis of the lever arm.

The apparatus preferably further comprises a cradle extending from the buoyant platform, the cradle arranged to support the wave energy capturing member at the docked height. The cradle preferably comprises a cradle groove, the cradle groove shaped to accept at least a portion of the wave energy capturing member. The cradle groove therefore preferably defines a surface arranged to abut said portion of the wave energy capturing member. In preferable embodiments, the lever arm is moved, rotated or pivoted about the fulcrum to a second distal end of the movement arc, opposing the first distal end, such that the wave energy capturing member is positioned at the docked height and is thus supported in the cradle. The cradle is preferably arranged to stabilise the wave energy capturing member against lateral forces when the wave energy capturing member is positioned at the docked height.

The apparatus preferably comprises a yaw mechanism, which may be positioned on the buoyant platform and arranged to rotate on the plane of the upper surface of the buoyant platform. The yaw mechanism thereby preferably defines a rotation axis perpendicular to the plane of the upper surface of the buoyant platform, and preferably perpendicular to the working stroke. Preferably the lever arm, actuating member and energy capturing member form an energy capturing assembly. In embodiments wherein the apparatus comprises a yaw mechanism, the yaw mechanism is preferably arranged to rotate the energy capturing assembly about the rotation axis. Such rotation may, for example, be arranged to optimally align the energy capturing member with a wave direction. For example, in embodiments wherein the wave energy capturing member comprises a shape having a long axis, the yaw mechanism may be arranged to rotate the energy capturing member such that the long axis is positioned perpendicular to a wave direction in use. In a storm configuration the yaw mechanism may be arranged, for example, to position the long axis parallel to the wave direction. Embodiments comprising a yaw mechanism preferably permit angling of the energy capturing assembly, through rotation thereof about the rotation axis, in order to optimally align the energy capturing assembly with waves of the body of water in the in-use configuration.

Preferably the lever arm is arranged to store elastic potential energy in response to movement by the wave energy capturing member and/or actuating member.

The apparatus preferably further comprises a mooring means arranged to tether the buoyant platform to a bed of a body of water. The mooring means is preferably arranged to define a distance between the buoyant platform and the bed of the body of water. The distance is preferably freely adjustable. The mooring means preferably comprises one or more inflexible lines, which may be ropes or chains, and preferably exerts an anchoring force on the buoyant platform said force preferably having a vertical component and a lateral component. The vertical component and the lateral component of the anchoring force preferably counteract one or more combined opposing forces, which may comprise those exerted by the buoyancy of the buoyant platform, or by waves or currents of the body of water. The mooring means preferably comprise a mooring means length which is preferably adjustable, the mooring means length preferably being adjustable by a winch around which the mooring means may be spooled. Adjustment of the length of the mooring means may permit movement of the buoyant platform from the transport configuration to the in-use configuration. Changes in conditions of the body of water, such as sea, tide, ocean or weather conditions, may require a change in the length of the mooring means such that the depth of the buoyant platform in the body of water is changed.

DETAILED DESCRIPTION

Specific embodiments will now be described by way of example only, and with reference to the accompanying drawings, in which.

A first example embodiment of a drive assembly and buoyant wave energy converting apparatus according to the present invention is shown in FIG. 1 to FIG. 6.

Figure 1:
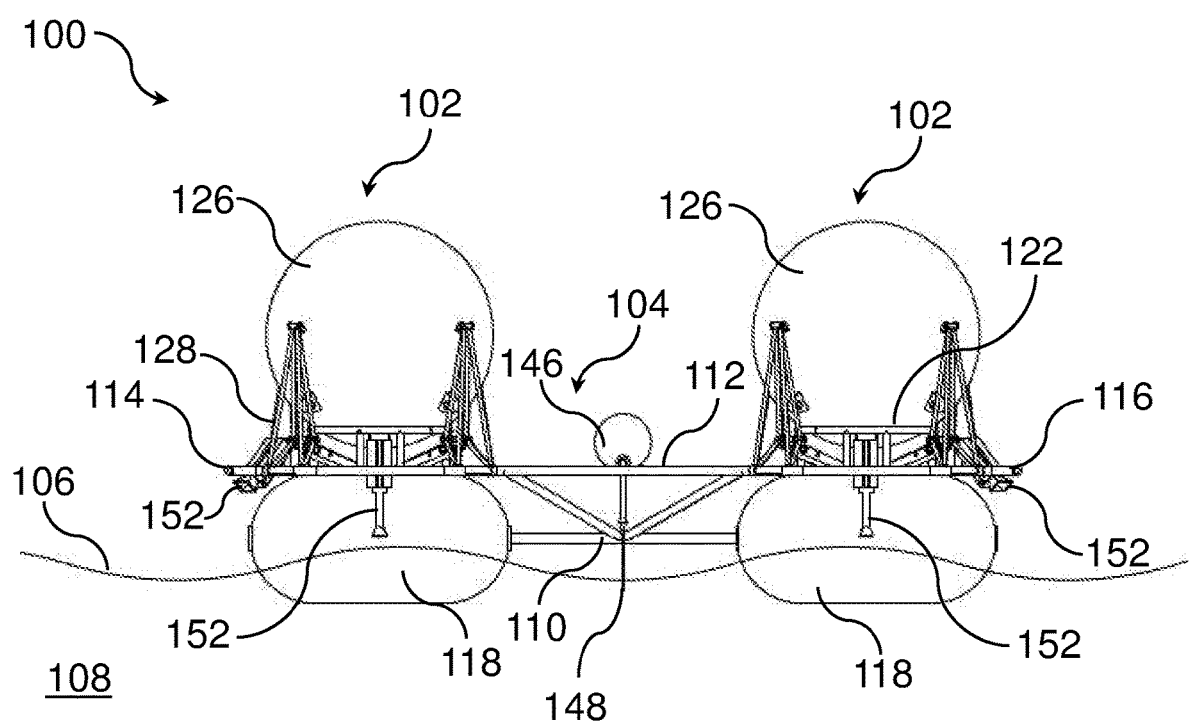
FIG. 1 is a lateral view of an example embodiment of a buoyant wave energy capturing apparatus in accordance with the second aspect of the present invention, comprising a drive assembly in accordance with the first aspect, the apparatus in a transport configuration.

Referring to FIG. 1, two equivalent drive assemblies 102 according to the first aspect are shown mounted atop a buoyant platform 104, forming an example buoyant wave energy converting apparatus 100 according to the second aspect. A lateral view of the apparatus 100 in shown in FIG. 1 in a transport configuration, floating atop the surface 106 of a body of water 108. In this configuration all moving parts and connections are above the water 108 and can be accessed for maintenance. The buoyant platform 104 comprises a reticulated steel frame 110 having a network of steel bars forming a planar rectangular upper surface 112 of the buoyant platform 104 having a first end 114 and a second end 116 opposing the first end 114.

Positioned abutting the underside of bars forming the upper surface 112 of the frame 110 are a pair of opposing floats 118, each float 118 positioned proximate one end of the buoyant platform 104. The lateral view of FIG. 1, showing a first side of the apparatus 100, shows the pair of opposing floats 118 positioned proximate the first end 114 and the second end 116 of the buoyant platform 104. The floats 118 are hollow and roughly ovoid in shape formed of a rigid polymer material, the hollow portion comprising air such that, in the transport configuration shown, the floats 118 support the buoyant platform 104 above the surface 106 of the body of water 108. The proportion of air to water in the hollow portion can be altered, and thus the invention may provide a fixed or variable buoyancy of the floats 118.

Protruding from the upper surface 112 of the platform 104 are two cradles 120, each positioned opposing one another proximate one of first end 114 and the second end 116 of the upper surface 112. The cradles 120 are formed of an annular steel bar 122 supported above the upper surface 112 of the platform 104 by a plurality of angled steel struts 124. The annular bar 122 of the cradle 120 forms an aperture leading to a cavity (not shown) formed by the annular bar 122 and supporting struts 124. The cavity of each cradle 120 is shown housing a lower portion of a spherical wave energy capturing float 126, forming part of one of the two drive assemblies 102. The spherical wave energy capturing floats 126 are hollow and are formed of a rigid polymer material, the hollow portion filled with air.

Located adjacent each cradle 120, and protruding from the upper surface 112 of the platform 104 are four lever arms 128 hingably coupled to the upper surface 112 of the platform 104 at a pivot point defining a fulcrum about which each lever arm 128 is arranged to rotate. The pivot points of the four lever arms 128 each form chamfered corners of a square on the upper surface 112 of the platform 104, the square having an origin aligned with the origin of the annular steel bar 122 of the cradle 120, such that the lever arms 128 are positioned about the outside of the cradle 120.

The lever arms 128 are each formed of a steel frame having a horizontal primary journal 130 housed within a bearing of the upper surface 112 of the platform 104 and aligned therewith, the primary journal 130 arranged to freely rotate within the bearing and defining the pivot point of the corresponding lever arm 128. Extending from opposing ends of the primary journal 130 are two coincident bars 132 forming a first triangular frame portion with the journal. The intersection of the two coincident bars 132 of the first triangular frame portion forms an upper corner 134 of the lever arm 128 distal to the platform 104. The lever arm 128 comprises a second and third triangular frame portion, extending from the first triangular frame portion, each having two coincident bars 136, one extending from the upper corner 134 of the lever arm 128 and the other protruding from an end of the primary journal 130 of the first triangular frame portion. The two coincident bars 136 of each of the second and third triangular frame portions intersect at a lower corner 138 of the lever arm 128 proximate the platform 104. The lower corners 138 of the lever arm 128 are joined by a horizontal secondary journal 140. Thereby, the bars of the steel frame of each lever arm 128 form a skewed (oblique) pyramidal frame, the first triangular portion (face) of the pyramid forming a longitudinal axis of the lever arm 128 between the upper corner and a central point on the primary journal 130 (the pivot point). In the transport configuration shown in FIG. 1, each lever arm 128 is positioned about the pivot point such that the longitudinal axis of the lever arm 128 is roughly perpendicular to the upper surface 112 of the platform 104.

In the embodiment 100 shown, the apparatus 100 further comprises a plurality of flexible ropes 142 (visible in FIG. 5 to FIG. 11) affixed to the upper corner of each of the lever arms 128 at a first end thereof. The second end of each of the flexible ropes 142, opposing the first end, is affixed to the spherical wave energy capturing float 126.

Figure 4:
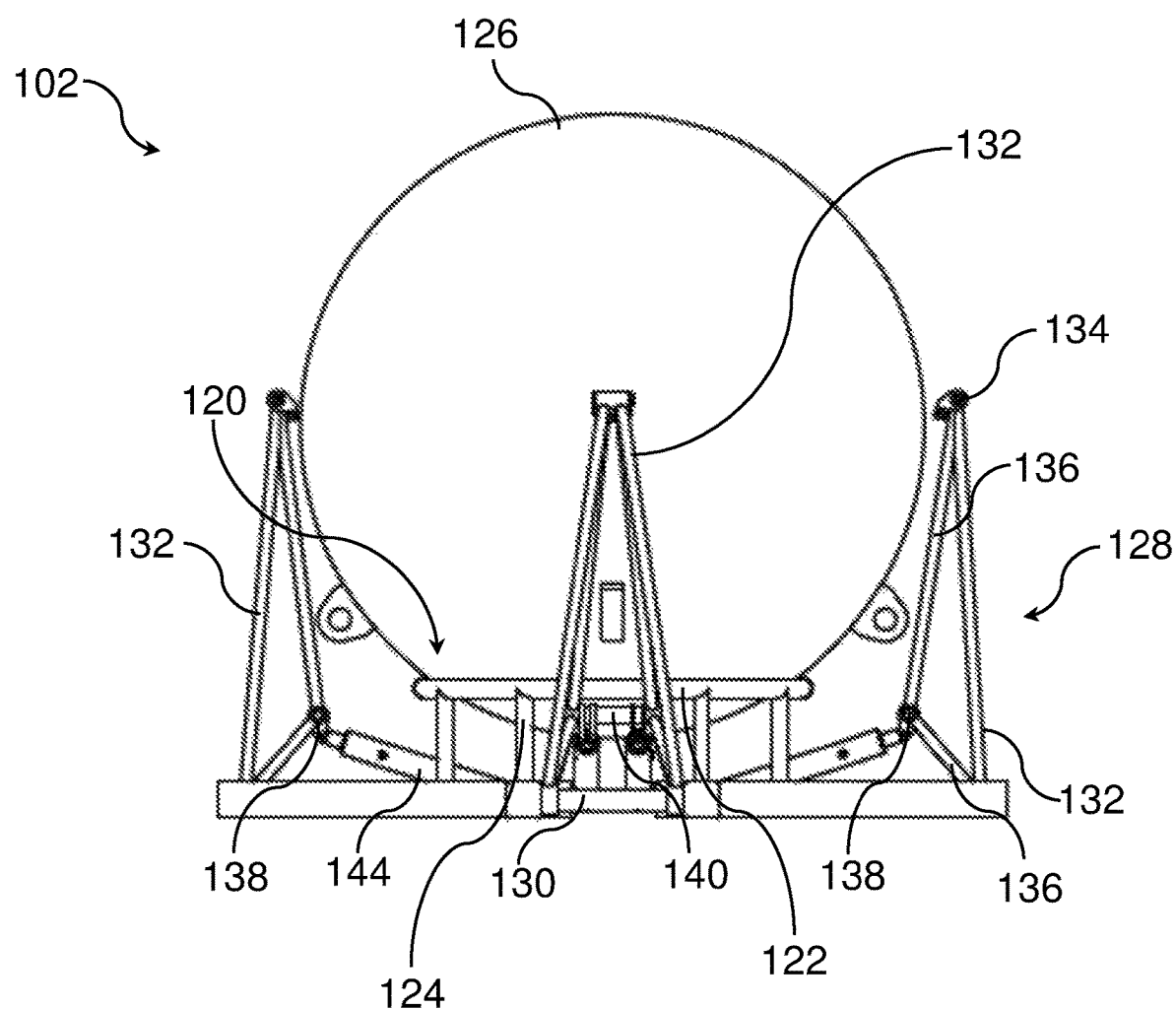
FIG. 4 is a close-up view of the drive assembly shown in FIG. 1 and FIG. 2.

Together, the spherical wave energy capturing float 126, the flexible rope 142 and the lever arm 128 form the drive assembly 102 as shown in the close-up view of the drive assembly 102 of FIG. 1 shown in FIG. 4.

Rotatably affixed to the lower corner of the lever arm 128 and extending therefrom is a piston rod of a hydraulic ram 144, the hydraulic ram 144 having a cylinder within which the piston rod may reciprocally move under pressure applied thereto by the corresponding lever arm 128. The cylinder of the hydraulic ram 144 is hingeably affixed to the upper surface 112 of the platform 104 at a pivot point about which the cylinder may rotate. The hydraulic ram 144 acts as an energy converter 144, converting mechanical energy from the corresponding lever arm 128 to electrical energy. The hydraulic ram is in electrical communication with an electrical output port 146, the electrical output 146 having an umbilical power line 148 extending therefrom toward the bed 150 of the body of water 108.

The platform 104 further comprises a plurality of contact points 152 spaced thereabout, the contact points 152 each supporting a corresponding inelastic mooring line 154. The mooring lines 154 extend from the corresponding contact points 152 toward the bed 150 of the body of water 108 where they are fixably engaged with an anchor 156. The mooring depicted comprises of four vertical lines and four angled lines to provide a high level of vertical and lateral stability to the platform 104, however, alternative mooring layouts will be appreciated.

In the transport configuration shown in FIG. 1, the apparatus 100 floats on the surface 106 of the body of the water 108 such that the apparatus may be transported to a desired position within the body of water 108.

Figure 2:
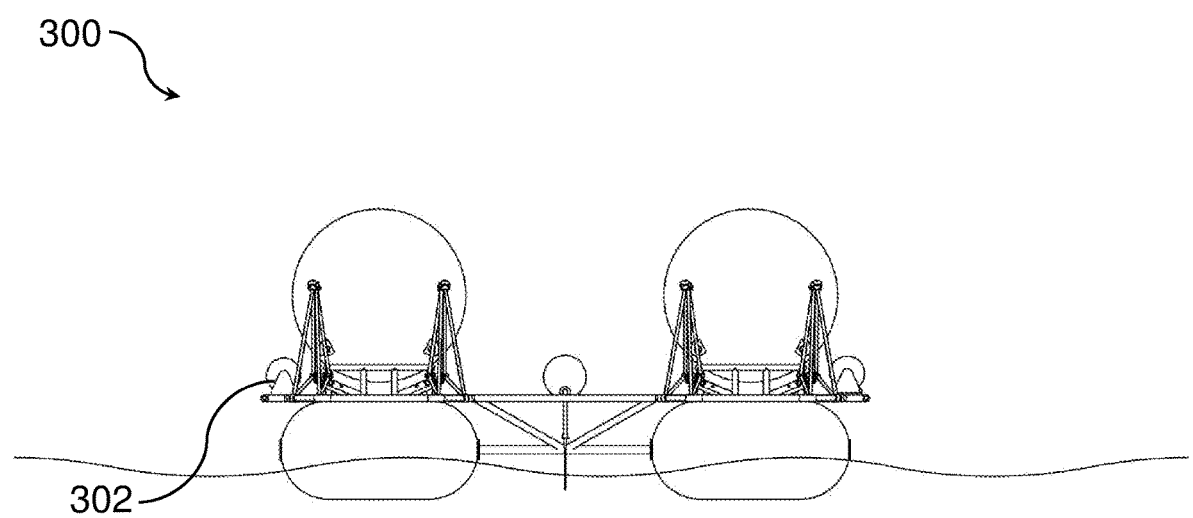
FIG. 2 is a lateral view of an alternative example embodiment of a buoyant wave energy capturing apparatus in accordance with the second aspect of the present invention, comprising a drive assembly in accordance with the first aspect, the apparatus in a transport configuration.
Figure 3:
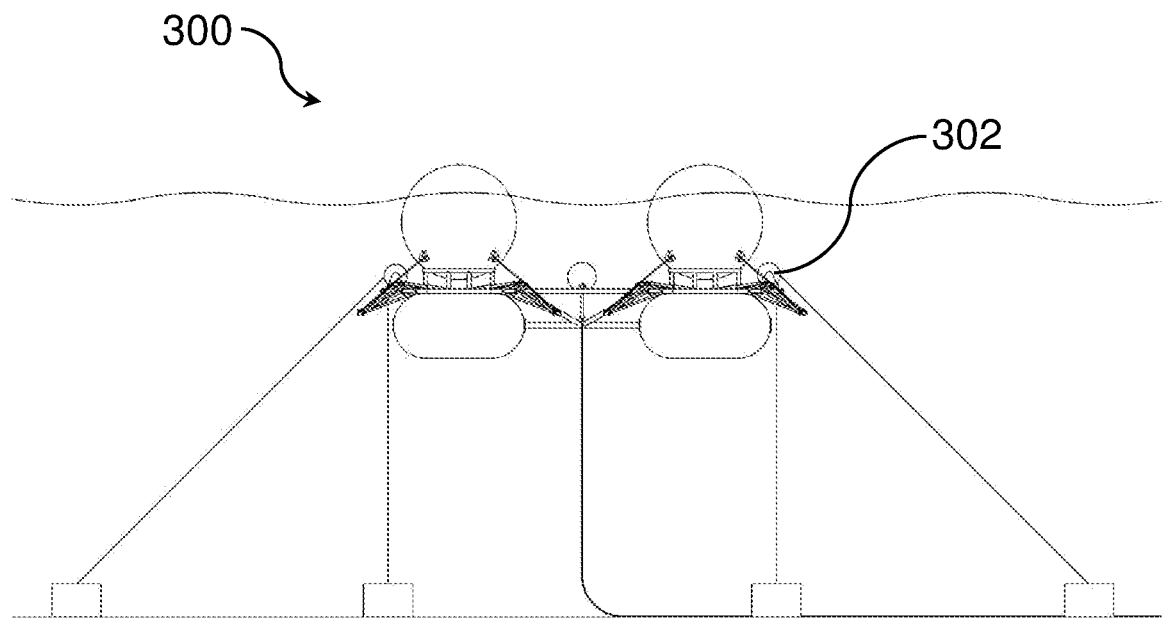
FIG. 3 is a further lateral view of the example embodiment of FIG. 2, being deployed from the transport configuration of FIG. 2 toward an in-use configuration.

A different embodiment 300 to that described above for FIG. 1 is shown in FIG. 2, having a drive assembly equivalent to that described and shown in FIG. 1 and FIG. 3, but wherein the mooring mechanism is provided by a plurality of winches 302 having a spool arranged to store a mooring line (not shown), and further arranged to spool the mooring line in order to submerge the buoyant platform in the body of water in an in-use configuration. FIG. 3 shows the embodiment of FIG. 2 being deployed from the transport configuration shown in FIG. 2 toward an in-use configuration wherein both the platform and the floats are submerged, the deployment occurring by way of spooling of the mooring lines onto the respective winches 302.

Figure 5:
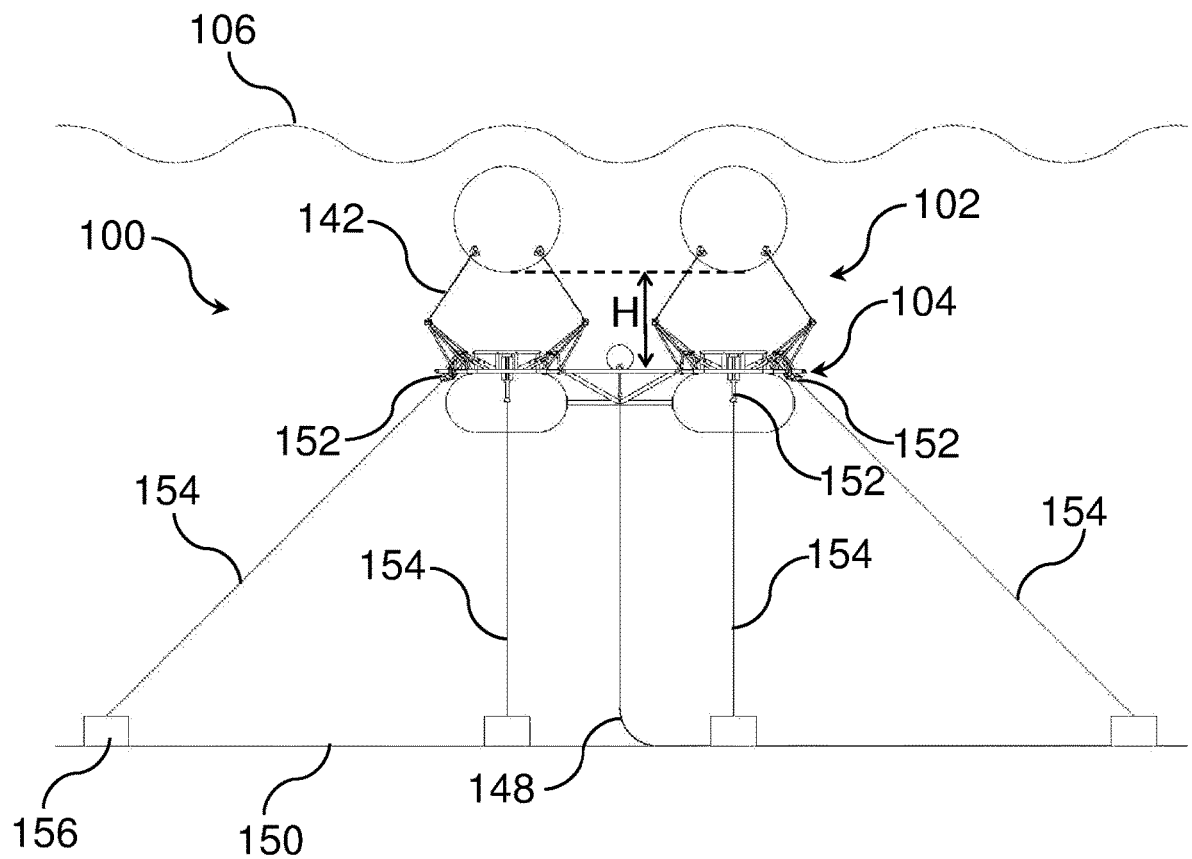
FIG. 5 is a lateral view of the example embodiment of FIG. 1 in an in-use configuration.
Figure 6:
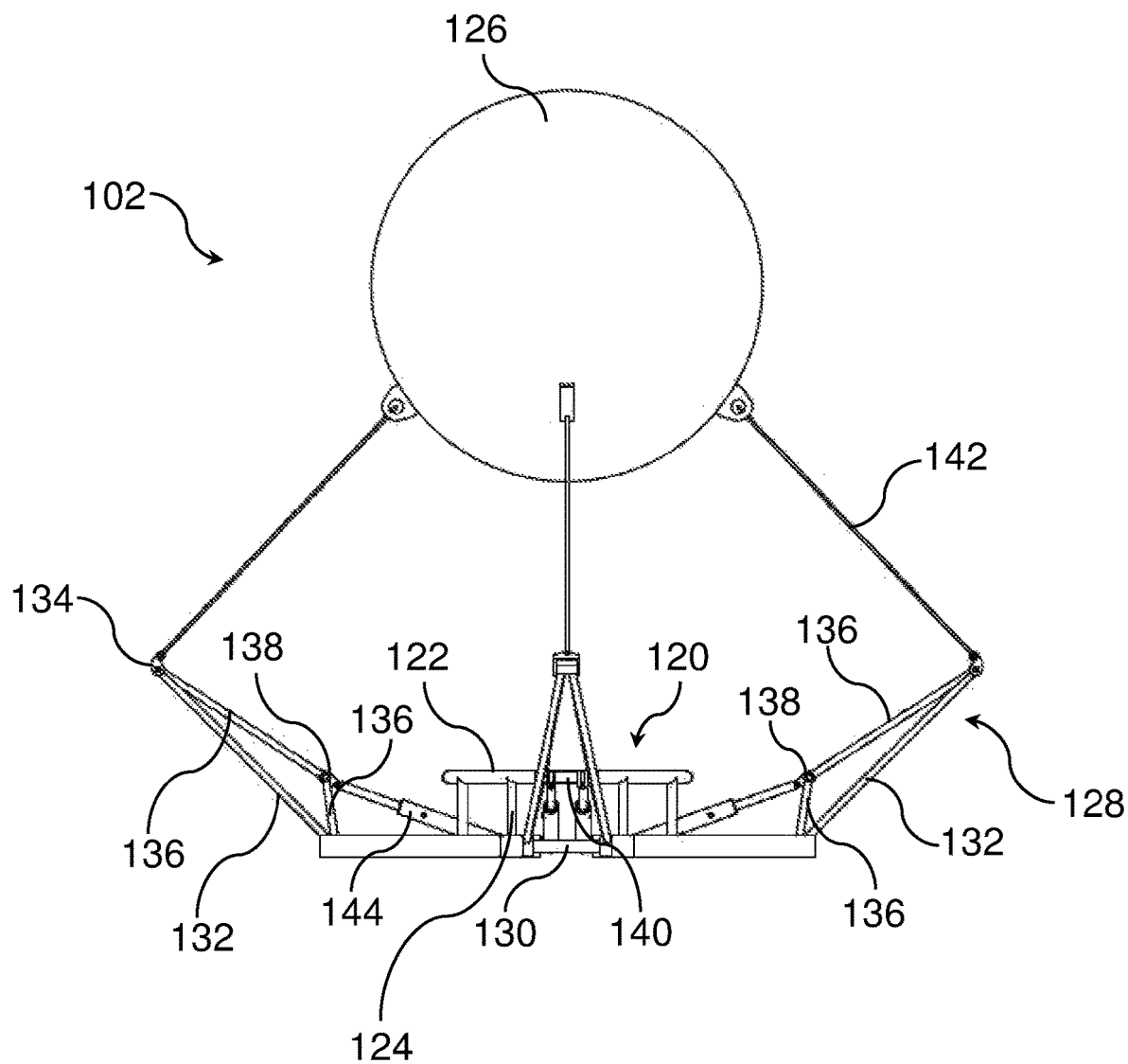
FIG. 6 is a close-up view of the drive assembly shown in FIG. 5.

Referring to FIG. 5, the example embodiment 100 is shown in an in-use configuration, submerged in the body of water 108 such that the mooring lines are affixed between the corresponding contact points 152 and the corresponding anchors 156, defining a depth of the platform 104 from the bed 150 of the body of water 108. In the in-use configuration shown, the energy capturing floats 126 are suspended from the flexible ropes 142 at a height H relative to the upper surface 112 of the platform 104, the height H defined by the position of the upper corners of the lever arms 128, which is in turn determined by the angle of rotation of the corresponding lever arms 128 about the respective pivot points. In the embodiment shown, the lever arms 128 are biased toward said angle of rotation to set the height H of the floats 126. The height H is set according to wave conditions in the body of water 108, the height H in the embodiment 100 shown in FIG. 5 being an in-use height H. At the in-use height H shown, the level of energy capturing by the floats 126 is optimised according to the wave conditions. In the embodiment 100 shown in FIG. 5, the in-use height is circa 20 m. Wave energy is captured by the floats 126 as they move up and down with the waves of the body of water 108. The movement of the floats 126 as a result tugs on the corresponding flexible ropes 142 affixed thereto. In-turn, the corresponding lever arms 128 are actuated by being rotated about the corresponding pivot point between a first position and a second position defining a working stroke. The movement of the lever arms 128 according to the wave energy capturing of the floats 126 is independent of the angle at which the lever arms 128 are biased toward in order to set the in-use height H of the floats 126. The rotation of the lever arms 128 between the first position and the second position therefore occurs about the biased position. Movement of the lever arms 128 causes movement of the corresponding energy converters 144 such that mechanical energy from the lever arm 128 is converted to electrical energy, which is fed from the energy converters 144 to the output 146 and along the umbilical power line 148 toward a power station (not shown). A close-up view of the drive assembly 102 in the in-use configuration of FIG. 4 is shown in FIG. 6. The configuration shown in FIG. 5 may be equally achieved with an embodiment such as that shown and described for FIG. 2 and FIG. 3.

Figure 7:
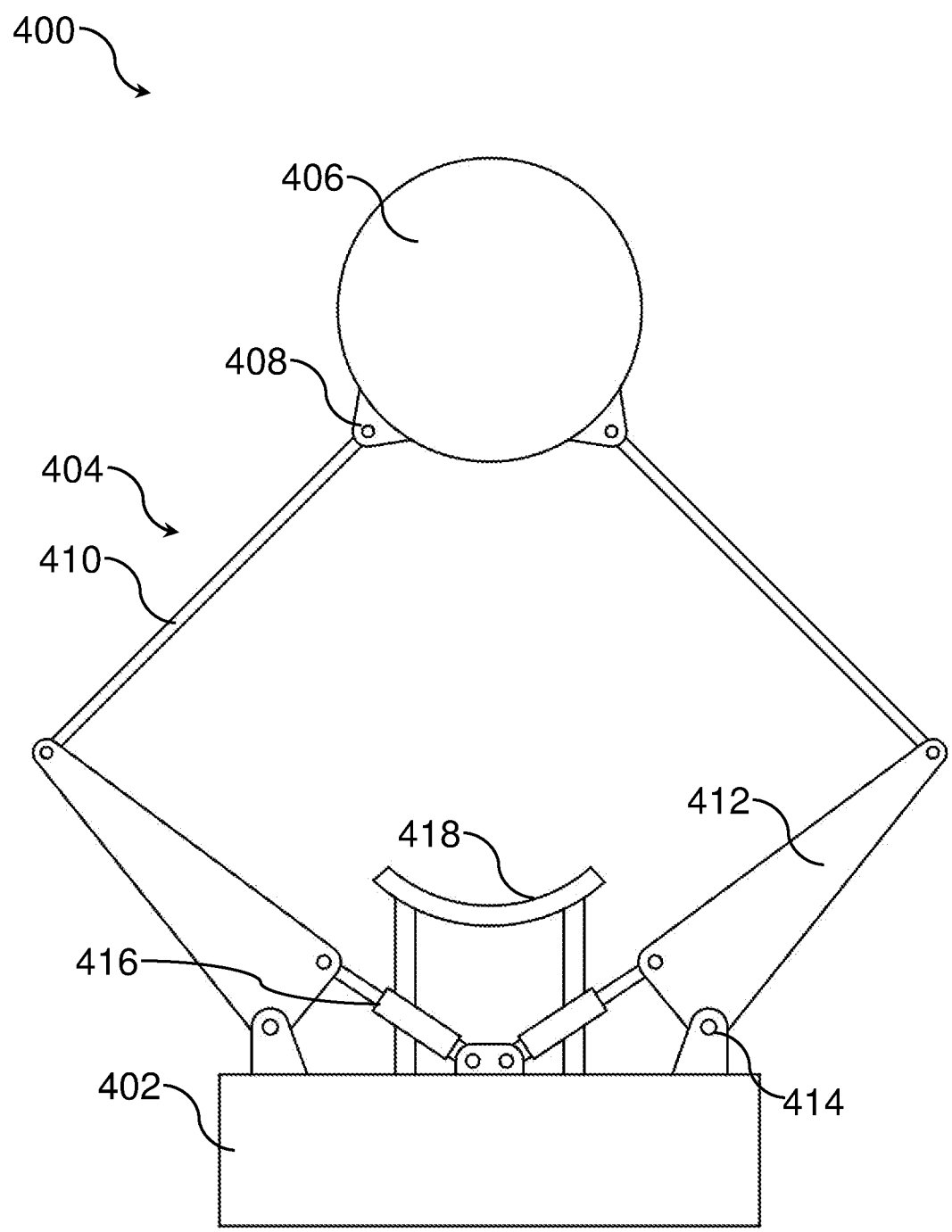
FIG. 7 is a close-up view of a further example embodiment of a drive assembly similar to that shown in FIG. 6.

FIG. 7 shows an alternate drive assembly 400 to that previously described but functioning in a similar manner to that of FIG. 1 to FIG. 6. In the embodiment 400 shown in FIG. 7, the drive assembly comprises a cylindrical buoyant platform 402 comprising a drive assembly 404 supported thereon. The drive assembly 404 comprises a spherical wave energy capturing float 406 having a pair of connection points 408 each connected to a first end of a respective flexible rope 410. The opposing second ends of the respective flexible ropes 410 are affixed to a respective lever arm 412 of the drive assembly 404. The lever arms 412 each comprise a triangular sheet of steel having the respective flexible rope 410 affixed to a first vertex thereof distal to the platform 402. The lever arm 412 comprises a second vertex affixed in a rotatable fashion to an upper surface of the buoyant platform 402 by way of a hinge 414 defining an arc of movement or rotation of the lever arm 412. A third vertex of the lever arm 412 is affixed to an energy converter 416, which in the embodiment shown is a hydraulic ram for illustration purposes, but may be any suitable such energy converter. The buoyant platform 402 further comprises a cradle 418 supported on the upper surface thereof and arranged to support the wave energy capturing float 406 thereon.

Figure 8:
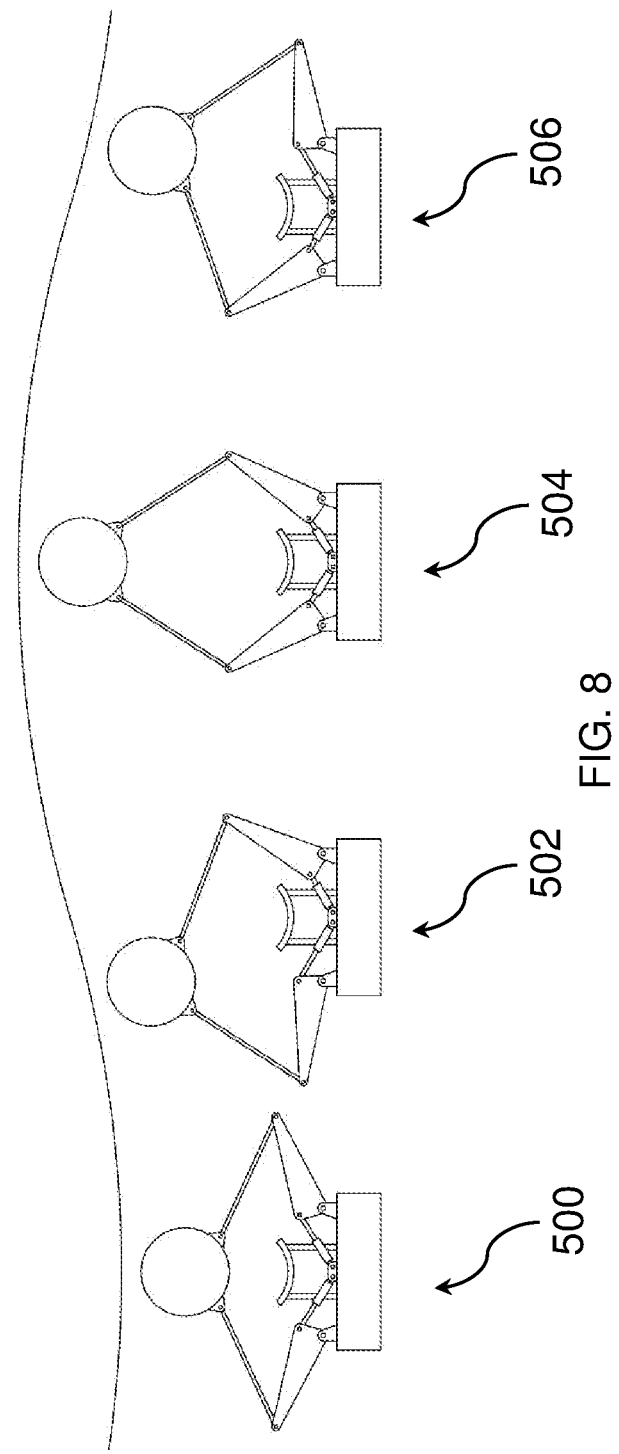
FIG. 8 depicts a sequence of lateral views, from left to right, of the embodiment of FIG. 7 in-use.

FIG. 8 shows a simple representation of the embodiment 400 of FIG. 6 submerged in a body of water in an in-use configuration, with FIG. 8 providing a sequence of views 500, 502, 504, 506 of the drive assembly 404, from left to right, capturing wave energy from waves of the body of water. From the leftmost view 500 to the rightmost view 506 of FIG. 8 the wave energy capturing float 406 of the drive assembly 404 is shown tracking an orbital path in the body of water, caused by a combination of the buoyant forces from the float and the lateral forces from the subsurface current of the waves. The buoyant forces from the float keep the respective ropes 410 taught at all times.

Figure 9:
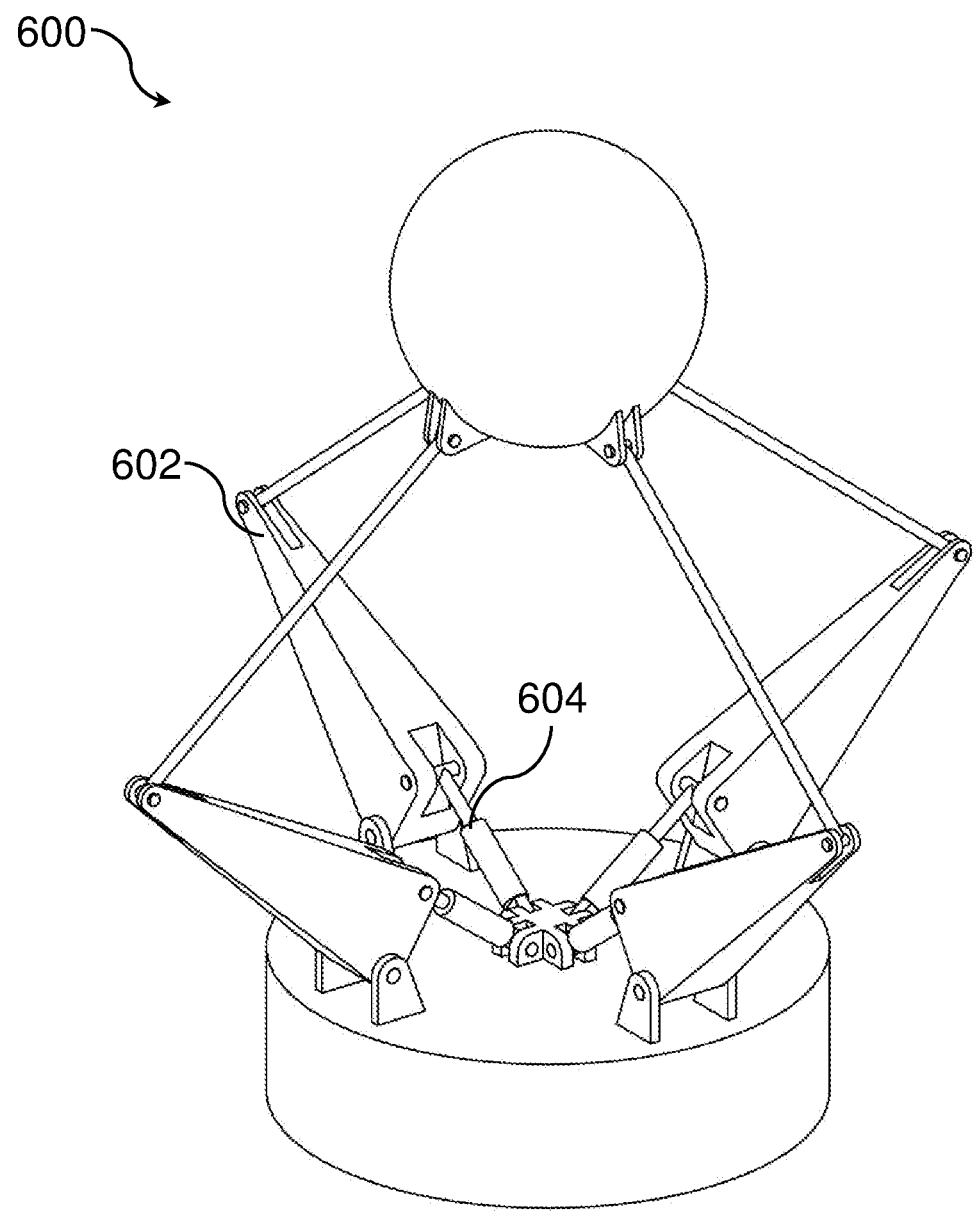
FIG. 9 is a further example embodiment of a drive assembly in accordance with the first aspect.

FIG. 9 shows an alternative embodiment 600 to that described and shown for FIG. 7 and FIG. 8, comprising four lever arms 602 each connected to a respective energy converter 604. The lever arms and corresponding energy lines and energy converters are arranged around and axisymmetric energy capturing float and allows energy to be absorbed from any direction. Different numbers of lever arms are possible, and the lever arms do not have to be equispaced and may be arranged to optimise energy capture from a predominant wave direction.

Figure 10:
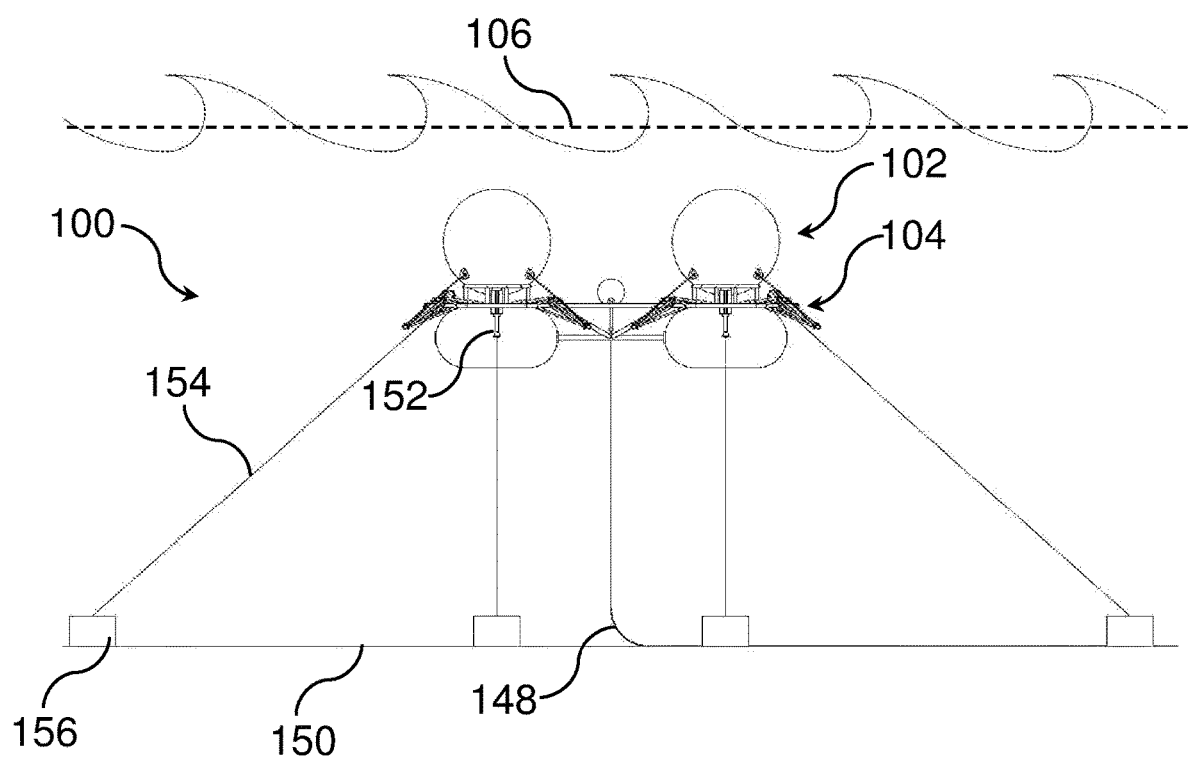
FIG. 10 is a lateral view of the example embodiment of FIG. 1 in a storm configuration.
Figure 11:
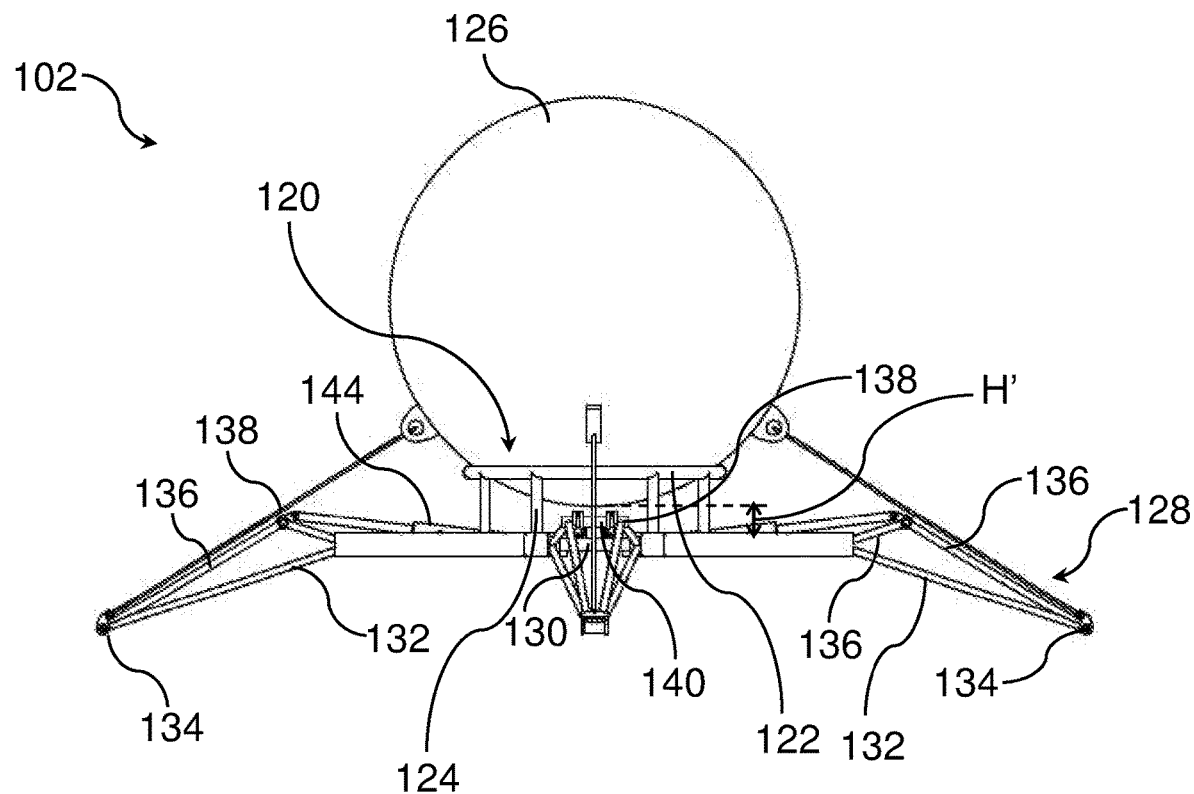
FIG. 11 is a close-up view of the drive assembly shown in FIG. 10.

FIG. 10 for illustration purposes is shown depicting the drive assembly of FIG. 1 and FIG. 4, but embodiments will be appreciated wherein any other drive assembly described herein may be used. FIG. 10 shows a lateral view of the buoyant wave energy converting apparatus 100 in a storm configuration. In the storm configuration, the platform 104 remains submerged and the lever arms 128 are rotated to an end point on their respective rotation arc such that the height of the float 126 relative to the buoyant platform 104 is minimised, such that the float 126 sits in its respective cradle 120. Such a rotation may be performed for example using a motor, by using weights on the terminal ends of the lever arms, or by any suitable mechanism. The height H' of the float 126 relative to the buoyant platform 104 shown in FIG. 6 is a docked height H'. At the docked height H', movement of the float 126 is prevented, which is advantageous during stormy conditions as forces exerted upon the float 126 by waves of the body of water 108 may be deleterious to the apparatus 100. A close-up view of the drive assembly 102 of the apparatus 100 in the storm configuration can be seen in FIG. 11.

Figure 12:
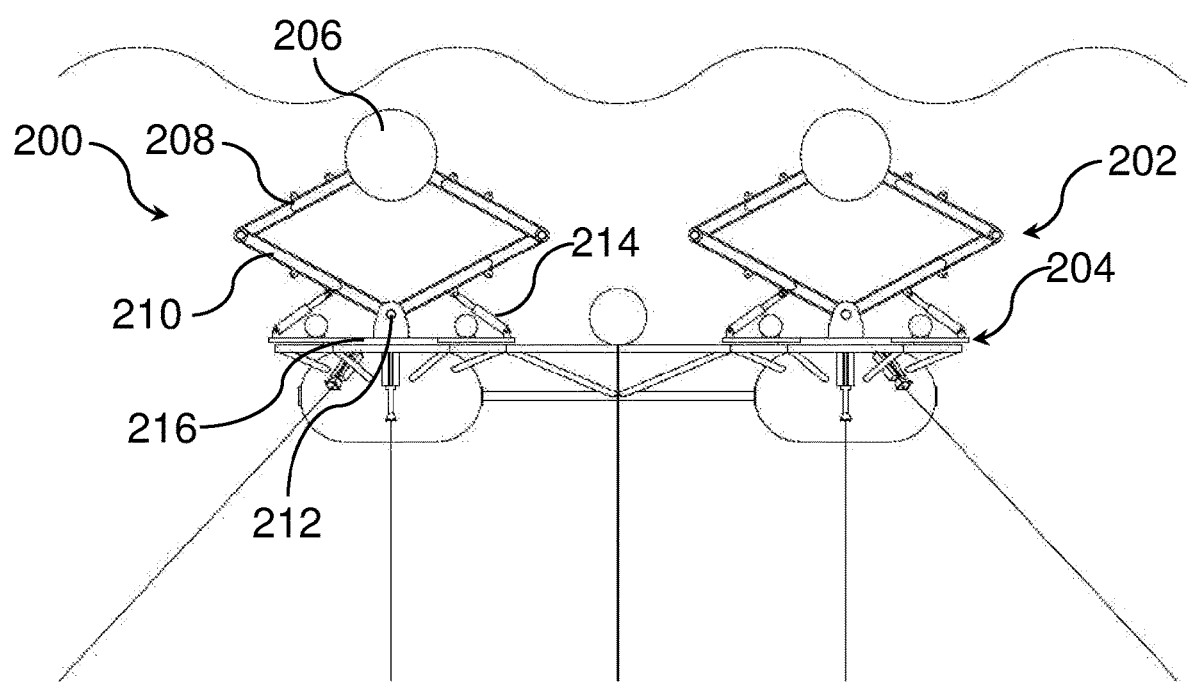
FIG. 12 is a lateral view of a second example embodiment of a buoyant wave energy capturing apparatus in accordance with the second aspect of the present invention, comprising a drive assembly in accordance with the first aspect, the apparatus in an in-use configuration.
Figure 13:
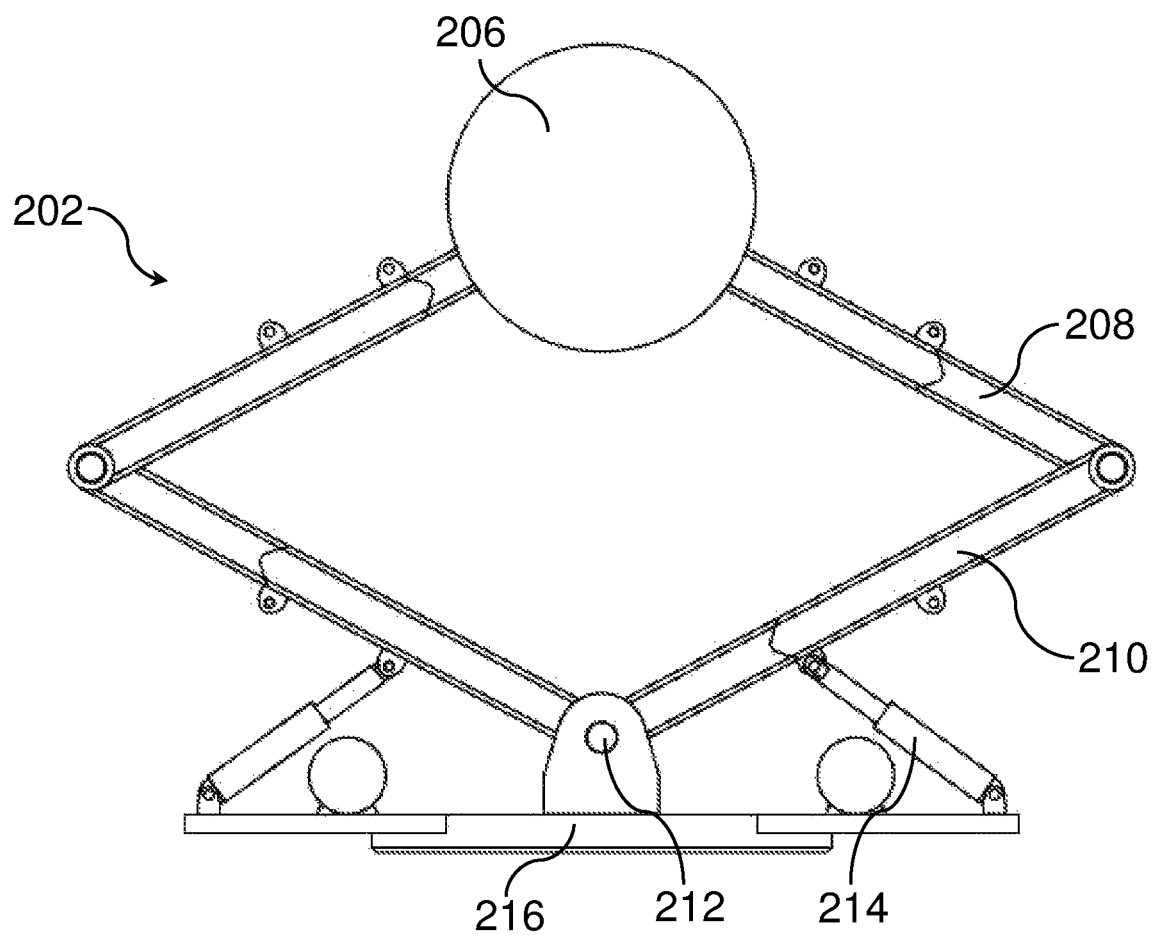
FIG. 13 is a close-up view of the drive assembly shown in FIG. 12.

An alternate example embodiment 200 of a buoyant wave energy generating apparatus 200 according to the second aspect of the present invention is shown in FIG. 12 and FIG. 13, the apparatus 200 comprising an example drive assembly 202 according to the first aspect. The embodiment 200 is shown in an in-use configuration.

In the embodiment 200 shown, the apparatus 200 comprises a buoyant platform 204 substantially as described for FIG. 1, the planar upper surface of which supports a pair of opposing drive assemblies 202. The drive assemblies 202 of FIG. 12 are shown in more detail in the close up view of FIG. 13. The drive assemblies comprise a cylindrical wave energy capturing float 206 affixed at each of two opposing sides thereof to first end of a corresponding rigid arm 208, which extends outwardly from said corresponding side of the float 206. Each rigid arm 208 is rotatably engaged with a lever arm 210. The lever arms 210 converge at a hinge joint 212 about which each lever arm is arranged to rotate. The lever arms 210 are each affixed to a piston rod 212 of a hydraulic ram 214, the ram 214 being hingeably supported atop the upper surface of the platform 204. The apparatus 200 further comprises a yaw mechanism 216, defining an axis of rotation perpendicular to the upper surface of the platform 204. The yaw mechanism 216 supports the drive assembly 202 such that the drive assembly may be rotated about the axis to be aligned with the direction of waves of the body of water. Said alignment improves the energy capturing capability of the apparatus by ensuring the full width of the cylinder is aligned perpendicularly to the waves.

In use, the cylindrical float 206 is positioned, or biased toward, an in-use height due to setting of an angle of rotation of the lever arms 210 about the hinge joint 212. The float 206 is arranged to move with the waves of the body of water such that the corresponding rigid arms 208 move and said lever arms 210 move in-turn. The lever arms 210 are arranged to drive the piston rod 212 reciprocally along the cylinder of the hydraulic ram 214, the distance of travel being defined as a working stroke, the working stroke having a distal endpoints at which the lever arms 210 are in a first position or a second position of rotation about the hinge joint 212.

Figure 14:
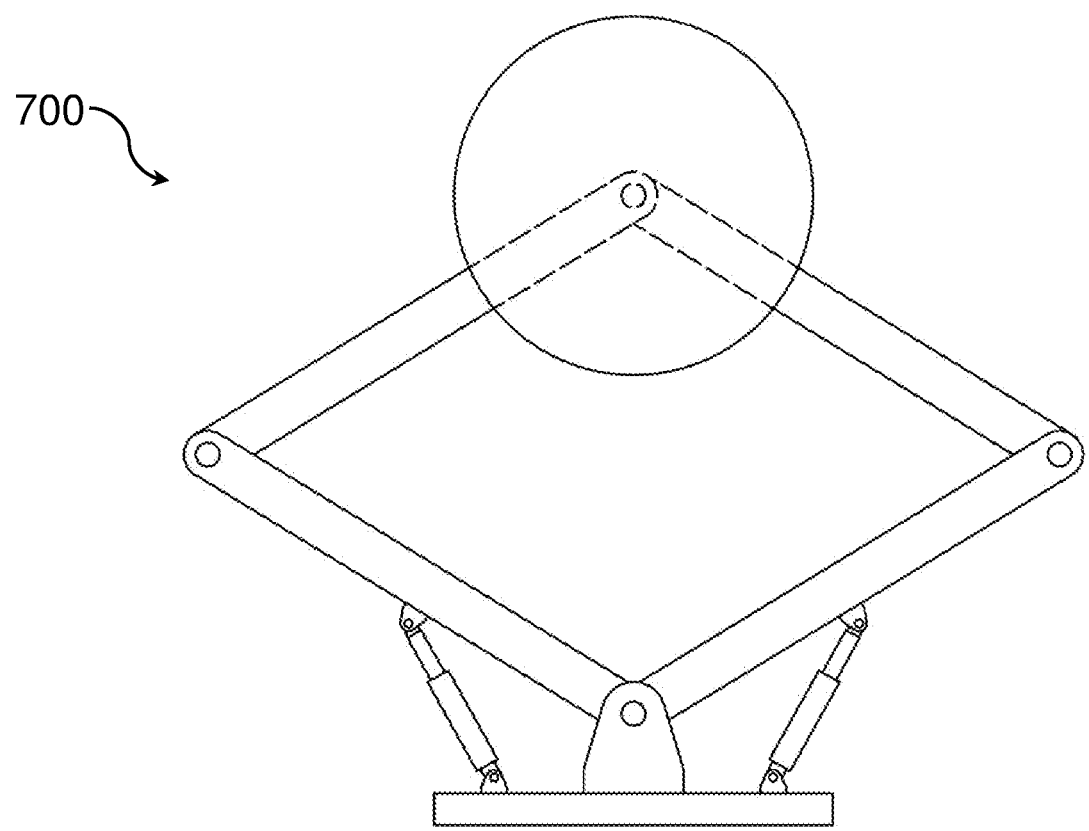
FIG. 14 is a close-up view of a further example embodiment similar to that of FIG. 12 and FIG. 13.
Figure 15:
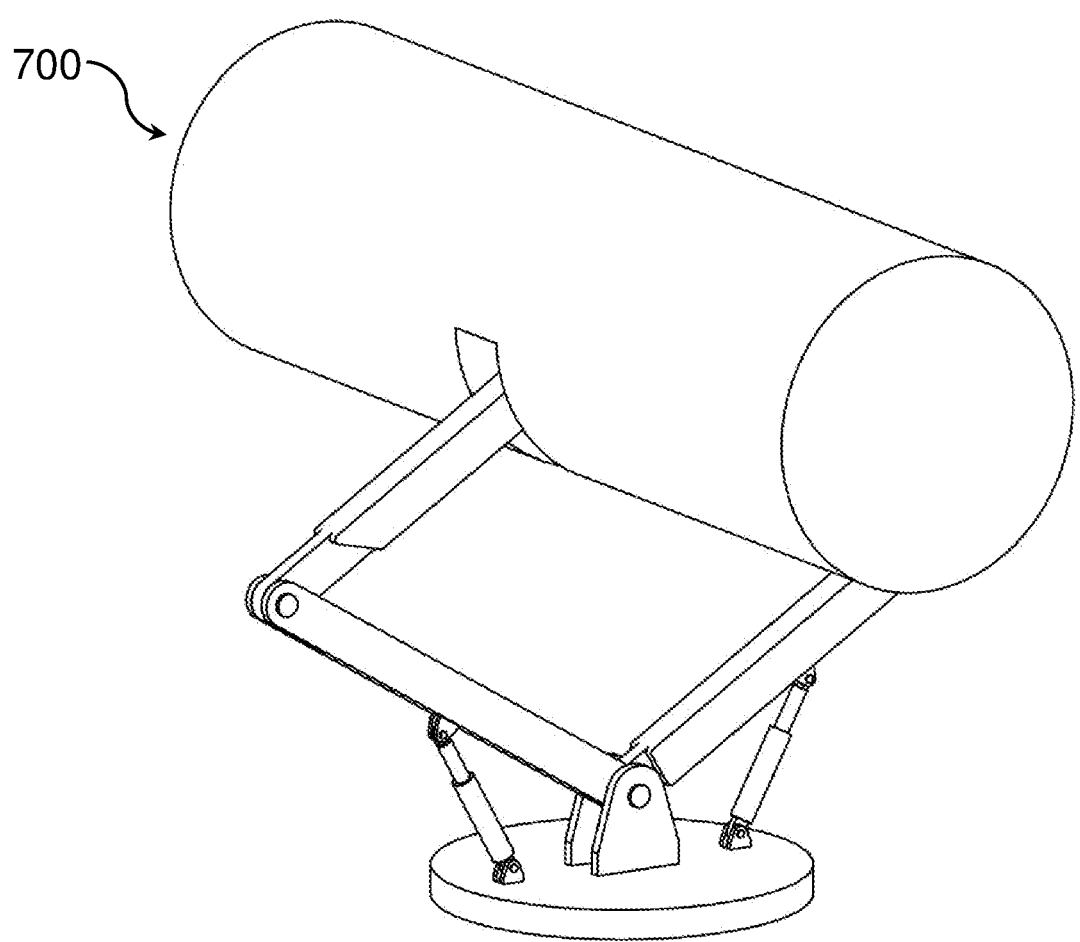
FIG. 15 is a perspective view of the embodiment of FIG. 14.

An alternate embodiment 700 to that described and shown 200 in FIGS. 12 and 13 is shown in FIGS. 14 and 15, with FIG. 15 showing a perspective view of the cylindrical float used in both the embodiments of FIG. 12 and FIG. 14. The embodiment 700 of FIGS. 14 and 15 shows an alternate positioning of the energy converters connected to respective lever arms of the drive assembly. The hinges positioned between the upper and lower lever arm sections permit the necessary range of motion for the energy capturing float to travel in an orbital path similarly to the embodiment of FIG. 8. Substituting an upper lever arm for the flexible lines of FIG. 8 means the system of FIGS. 14 and 15 can operate in both tension and compression which allows a lower buoyancy B (or a negative buoyancy) in the energy capturing float which in turn reduces standing loads in the drive assembly.

Figure 16:
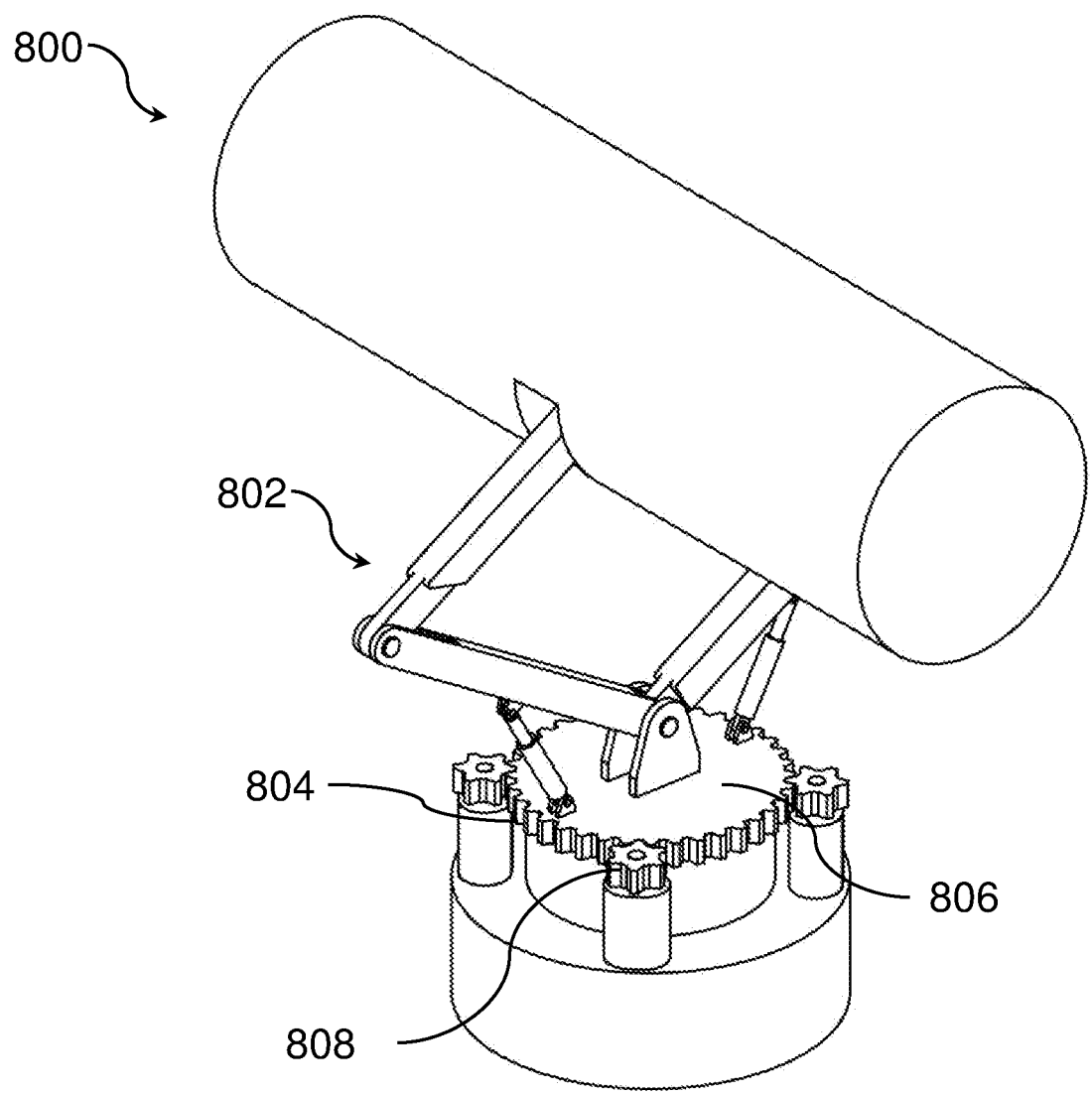
FIG. 16 is a perspective view of a drive assembly similar to that of FIG. 15 having a yaw mechanism.

A further embodiment 800, having a drive assembly 802 substantially equivalent to that of FIG. 14 and FIG. 15 is shown in FIG. 16, further comprising a yaw mechanism 804 comprising a central ring gear 806 and four pinion drives 808 each driven by a motor (not shown) and used to rotate the drive assembly 802 about a rotational axis. The section of the embodiment 800 comprising the yaw mechanism 804 is arranged to rotate in order to orientate the long axis of the float perpendicular to a wave direction for maximum wave energy capture, and parallel to a wave direction for minimum drag in a storm survival state.

Figure 17:
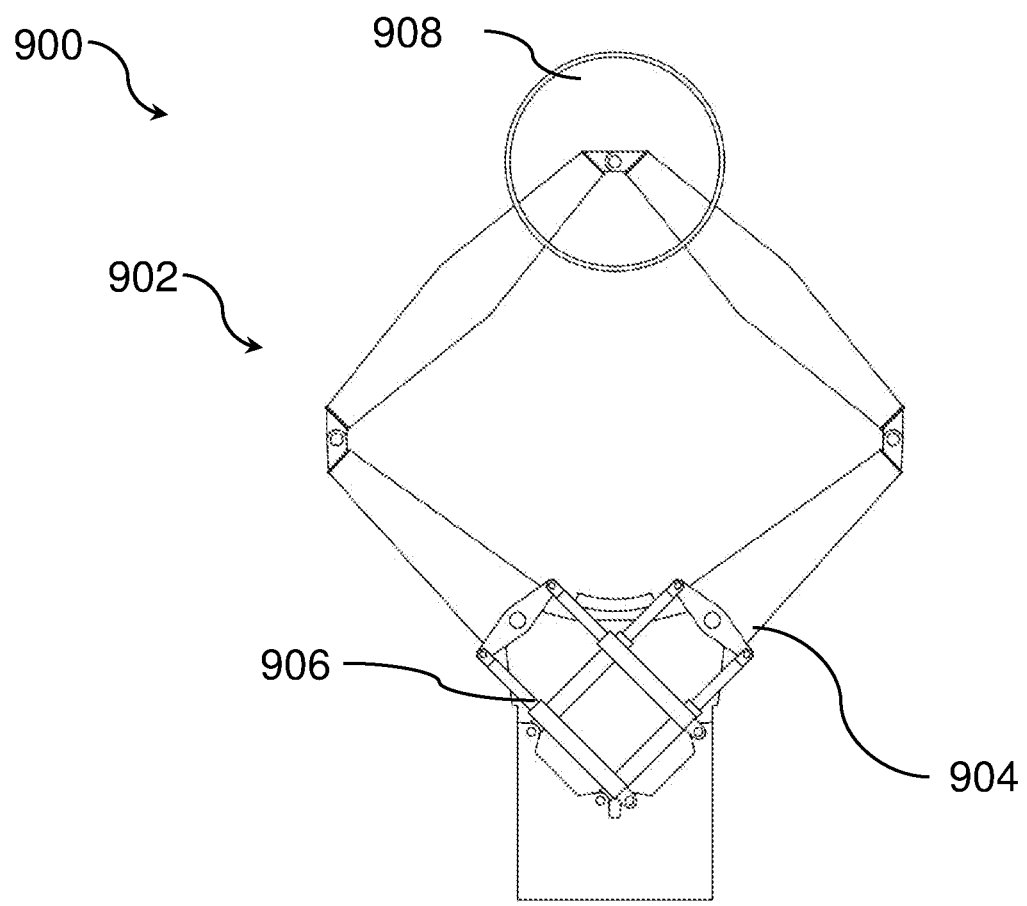
FIG. 17 is a lateral view of a further example embodiment of a drive assembly in accordance with the first aspect, having a float positioned at an in-use height.
Figure 18:
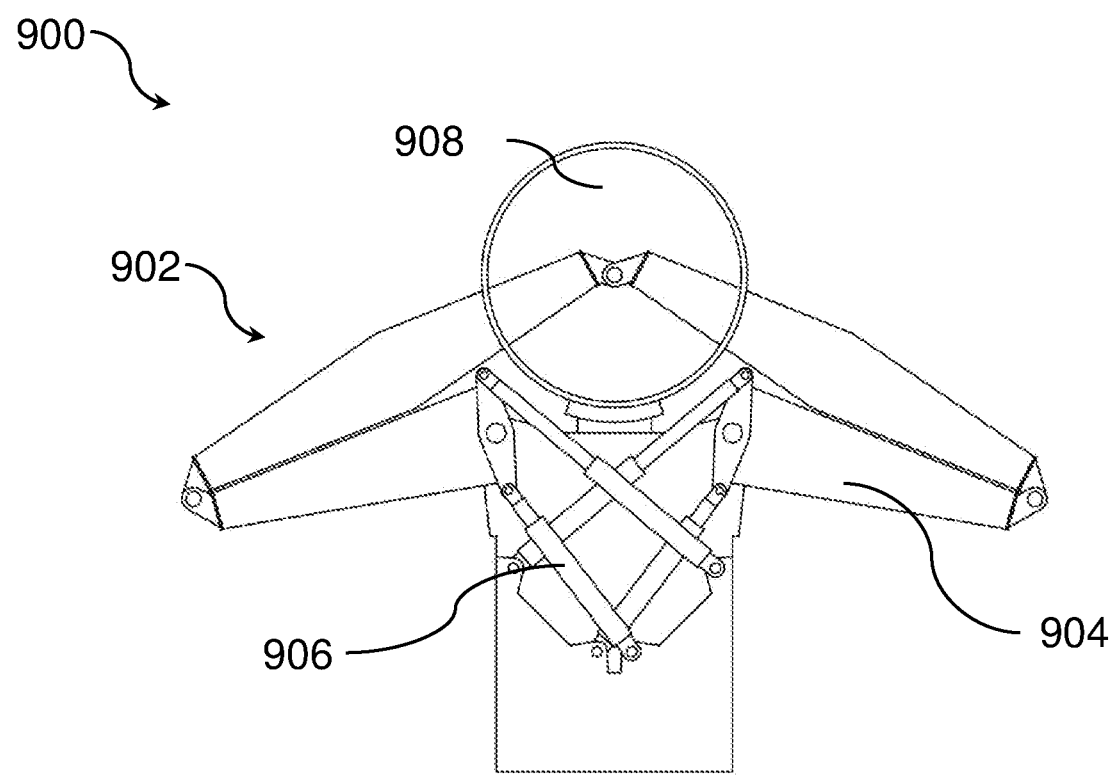
FIG. 18 is a lateral view of the embodiment of FIG. 17, the float being positioned at a docked height.

A further embodiment 900 is shown in FIG. 17 and FIG. 18 wherein each of two lower vertices of the respective lever arms 904 of the drive assembly 902 are affixed to a respective energy converter 906. Movement of the lever arms 904 by the wave energy capturing float 908 in use therefore causes actuation of all energy converters 906 throughout the working stroke performed by the lever arms 904, therefore preferably maximising energy conversion. FIG. 17 shows the float 908 at an in-use height described herein, and FIG. 18 shows the float 908 at a docked height also described herein. The energy converters 906 of a pair of vertices shown will operate antagonistically, i.e. when one is compressed the other is extended. This arrangement preferably creates a more even loading on the lever arm.

Figure 19:
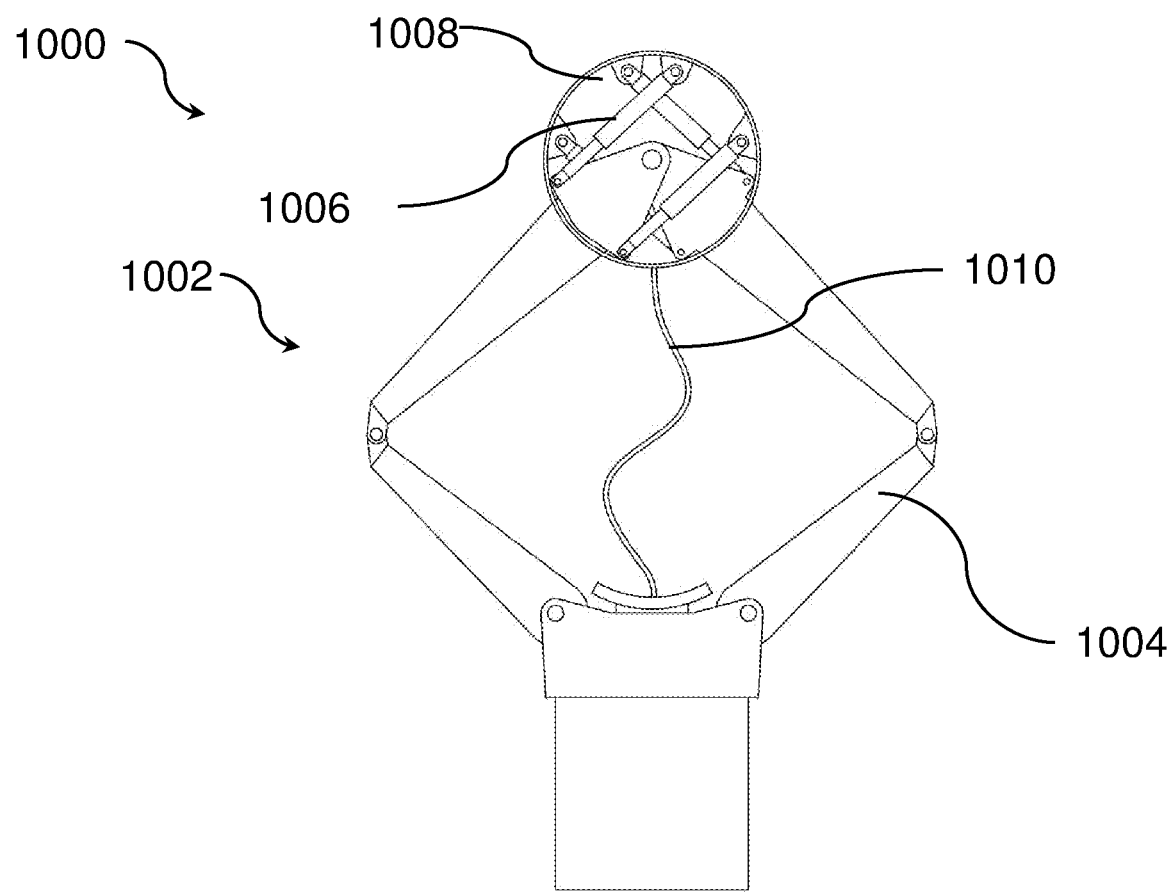
FIG. 19 is a lateral view of a further example embodiment of a drive assembly in accordance with the first aspect, having energy converters contained with the float.

A further embodiment 1000 is shown in FIG. 19 similar to that of FIG. 17 and FIG. 18, but wherein the energy converters 1006 are position inside the cylindrical float 1008 of the drive assembly 1002 such that movement of the lever arms 1004 by the float 1008 causes energy conversion within the float and, in the example shown, transmission by way of a power line 1010. Containment of the energy converters 1006 in the float 1008 preferably provides the ability to minimise occupancy of space on a platform (not shown) by the energy converters 1006.

Figure 20:
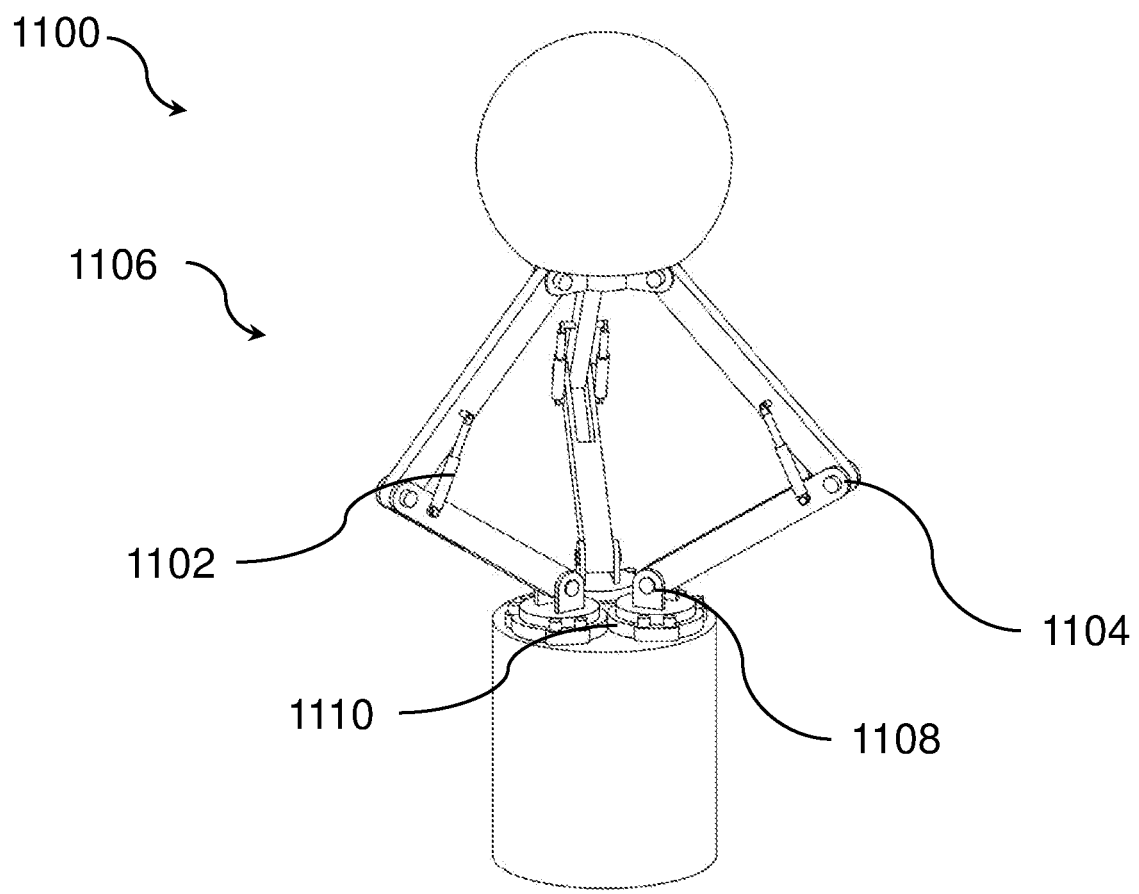
FIG. 20 is a lateral view of a further example embodiment of a drive assembly in accordance with the first aspect, having energy converters positioned at joints between lever arms of the drive assembly.

FIG. 20 shows a similar embodiment 1100 to that described for FIG. 14 and FIG. 15, but wherein the energy converters 1102 are positioned at a joint between lever arms 1104 of the drive assembly 1106. This embodiment demonstrates that the energy converters may be positioned at any point of the apparatus such that movement of the lever arm of the drive assembly may act to drive a working stroke of the energy converter. The embodiment 1100 has a similar omni-directional capability of the embodiment of FIG. 1 but with rigid upper lever arms 1104 instead of flexible ropes. To enable this principle to function an additional degree of freedom needs to be introduced to the system. Therefore, the lower lever arms are attached to the platform by both hinges 1108 and swivels 1110 i.e. the hinges are mounted on swivels so the lever arm can rotate slightly as it travels through its working stroke.

Figure 21:
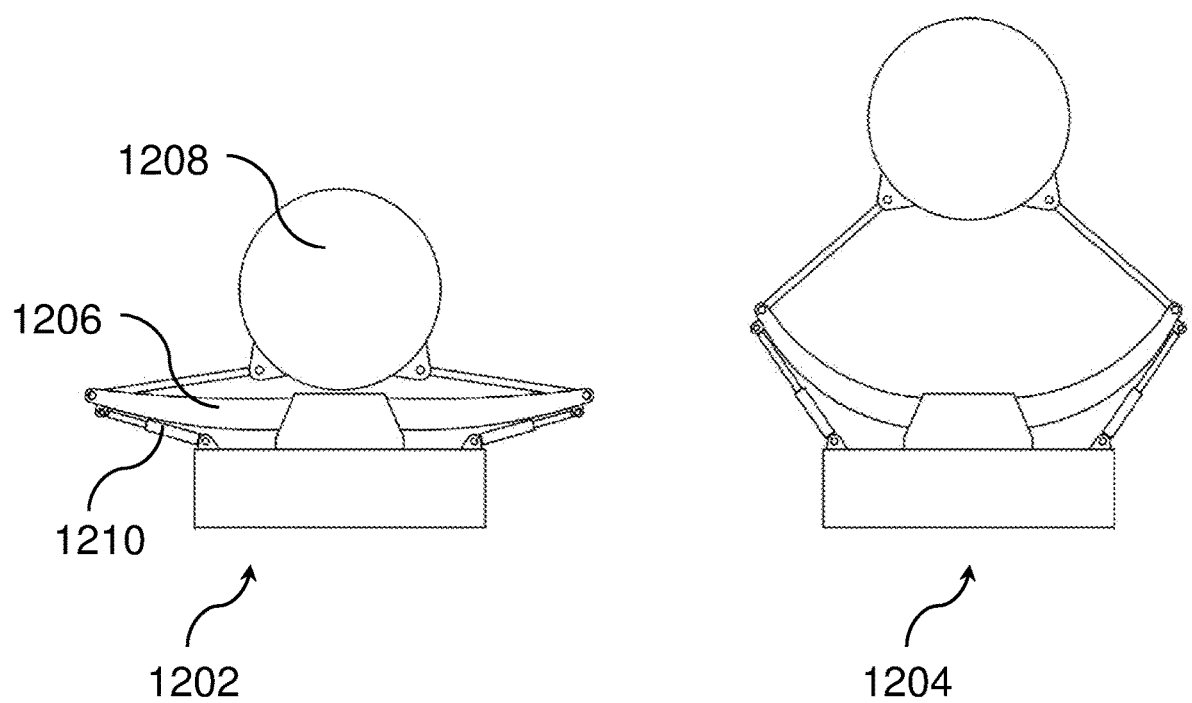
FIG. 21 is a sequence of lateral views of a further example embodiment, from left to right, of a drive assembly in accordance with the first aspect having flexible lever arms.

FIG. 21 shows an embodiment 1200 wherein the lever arms 1206 of the drive assembly take the form of flexible arms biased to a first position shown in the left-most depiction 1202 of FIG. 21. Movement of the float 1208 preferably moves one terminal end of the flexible lever arms 1206 to a second position wherein the lever arms are flexed, as shown in the rightmost depiction 1204. The first position 1202 and the second position 1204 define distal ends of a working stroke of a respective energy converter 1210 affixed to the terminal ends of the flexible lever arms 1206. The flexible lever arms 1206 act to store elastic potential energy arranged to drive the energy converters.

It will be appreciated that the above described embodiments are given by way of example only and that various modifications may be made to the described embodiments without departing from the scope of the invention as defined in the appended claims. For example, in the transport configuration of the embodiments shown, the lever arms can be brought into an upright position by the energy converters. Alternatively, a separate mechanism (not shown) could be used to bring the lever arms into the upright position, to avoid compromise to the design of the energy converters. Such a mechanism might be a biasing mechanism, and may be an inherent elastic property of the lever arms.

In the storm configuration shown, the lever arms are brought into a downward position. The energy converters, a separate mechanism (not shown), or weights on the end of the lever arms (not shown) may optionally be used to achieve this. In this storm configuration the wave energy capturing floats are held securely against a cradle by tension in the connecting lines.

To deploy the apparatus into its in-use configuration from its transport configuration, the apparatus is connected to preinstalled mooring lines which are attached to the seabed by anchors. The mooring lines are adjusted in length by winches on the device. The winches reel-in the mooring lines to pull the device underwater, overcoming the buoyancy in the buoyancy floats, to position the device at the required depth.

The preferred embodiment described shows the mooring winches arranged in pairs of one vertical and one angled mooring line on the corners of the platform, however other mooring layouts are possible.

The device has a submerged in-use configuration in which the platform is submerged to a level which allows the wave energy converters to function and generate energy. The wave energy capturing floats may be on or close to the sea surface and can be moved by the waves.

The waves cause the wave energy capturing floats to be moved by the waves. This movement in turn causes the floats to pull on the ropes or rigid arms which in turn moves the lever arms, which additionally in turn causes the energy converters to be compressed and extended and generate electricity/convert energy.

Typically, the lever arms and therefore the energy capturing floats will be biased to a neutral position (the in-use height) by the energy converters. The waves will cause the float to move from its neutral position in an orbiting, reciprocating or other repetitive pathway, which will cause the levers to rotate about the hinged joint and the energy converters to reciprocate along the working stroke, through the neutral position, generating power.

The lever arrangement show is for illustration only and multiple permutations of line attachment position, hinge position, and energy converter attachment position can be envisaged that remain within the scope of the invention.

The device has a submerged storm survival configuration in which the entire machine is pulled down to a deeper depth by the mooring winches to avoid the high wave forces close to the sea surface. In addition, the energy capturing float is secured into the cradle by bringing the lever arms into a downward position. This is the same arrangement for the lever arms as described for the in-use configuration above.

In the storm configuration the device is protected from the high forces that would otherwise be experienced if the machine was left in its operating configuration, and not parts of the device are able to move relative to each other, eliminating the risk of damage from parts of the machine clashing with each other.

The second embodiment operates in a similar manner to the first embodiment but uses both a lower lever arm that has a hinged joint to the platform and an upper lever arm that has a hinged joint to the lower lever arm and a hinged joint to the energy capturing float.

The machine of the second embodiment works in a very similar way to the first embodiment, however, substituting a lever arm for a flexible rope means the system can operate in both tension and compression which allows a lower buoyancy in the energy capturing float which in turn reduces standing loads in the drive assembly.

Other configurations such as those described for the first embodiment (transport configuration, storm configuration) will be appreciated for the second embodiment. In the storm configuration, the lever arms may be folded together and the float can be docked against features (not shown) on the platform or on the lower lever arms. The docked position is used when the machine is, for example, in its surface, or storm survival configurations.

The lever arms are rigid in some of the embodiments shown. Other similar embodiments will be appreciated wherein the lever arms are flexible, and may therefore perform the function of a spring, or elastic energy storing member, in the apparatus.

The invention claimed is:

1. A drive assembly arranged to transfer wave energy to an energy converter, the drive assembly comprising,
   a float;
   a lever arm coupled to the float, the lever arm being movable between a first position and a second position to define a working stroke;
   wherein the lever arm is coupled to the energy converter to transfer energy from the float to the energy converter; wherein the float is arranged to move the lever arm between the first position and the second position; wherein the first position and the second position define distal end points of the working stroke; the working stroke being configured to drive the energy converter;
   wherein the drive assembly is arranged to be mounted onto a buoyant platform, such that the float is positioned at a height relative to an upper surface of the buoyant platform; and
   wherein the lever arm is arranged to move to adjust the height between an in-use height and a docked height, the in-use height being greater than the docked height, wherein movement of the lever arm by the float occurs by way of rotation of the lever arm about a fulcrum to define a rotation arc or by way of flexion of at least a portion of the lever arm, wherein the movement occurs by flexion of the lever arm, and wherein the lever arm is arranged to store elastic potential energy in the range of 5 to 50 MJ in response to said movement by the float.

2. The drive assembly of claim 1, wherein the lever arm is coupled to the float by way of a flexible rope arranged to transfer energy from the float to the lever arm.

3. The drive assembly of claim 1, wherein the lever arm is coupled to the float by way of at least one selected from a flexible rope and a rigid member.

4. The drive assembly of claim 1, wherein the float comprises a buoyant portion and a nonbuoyant portion.

5. The drive assembly of claim 1, wherein the float is positioned at a height relative to an upper surface of the buoyant platform.

6. The drive assembly of claim 5, wherein the adjustment of the height by the lever arm is independent of the first and second positions of the lever arm.

7. The drive assembly of claim 1, wherein the energy converter comprises one selected from the group consisting of a rotational generator, a linear generator, and a hydraulic pump.

8. A buoyant wave energy converting apparatus, the apparatus comprising:
   a drive assembly arranged to transfer wave energy to an energy converter, the drive assembly comprising, a wave energy capturing float; and
   a lever arm coupled to the wave energy capturing float, the lever arm being movable between a first position and a second position to define a working stroke;
   wherein the lever arm is arranged to be coupled to the energy converter and is further arranged to transfer energy from the wave energy capturing float to the energy converter;
   further wherein the wave energy capturing float is arranged to move the lever arm between the first stroke position and the second stroke position; and
   wherein the first stroke position and the second stroke position define distal end points of the working stroke; the working stroke arranged so as to drive the energy converter;
   wherein the apparatus further comprises a buoyant platform arranged to support the drive assembly, the wave energy capturing float being positioned at a height relative to an upper surface of the buoyant platform; and
   wherein the lever arm is arranged to move to adjust the height between an in-use height and a docked height, the in-use height being greater than the docked height; and
   wherein the drive assembly is a drive assembly as claimed in claim 1.

9. The buoyant wave energy converting apparatus of claim 8, wherein adjustment of the height by the lever arm is independent of the working stroke.

10. The buoyant wave energy converting apparatus of claim 9, wherein the buoyant platform comprises an in-use configuration in which the buoyant platform and the wave energy capturing float of the drive assembly are submerged in a body of water, and wherein the lever arm is positioned on a rotational arc such that the wave energy capturing float is positioned at the in-use height.

11. The buoyant wave energy converting apparatus of claim 10, wherein the buoyant platform comprises a storm configuration in which the buoyant platform and the wave energy capturing float are submerged in a body of water, and wherein the lever arm is positioned on the rotational arc such that the wave energy capturing float is positioned at the docked height.

12. The buoyant wave energy converting apparatus of claim 11, wherein the buoyant platform comprises a transport configuration in which the buoyant platform is floating on a surface of a body of water, and wherein the wave energy capturing float is positioned at the docked height.

13. The buoyant wave energy converting apparatus of claim 12, wherein the apparatus further comprises a cradle extending from the buoyant platform, the cradle arranged to support the wave energy capturing float at the docked height.

14. The buoyant wave energy converting apparatus of claim 13, wherein the lever arm and energy capturing float form an energy capturing assembly, and wherein the apparatus further comprises a yaw mechanism, the yaw mechanism arranged to rotate the energy capturing assembly about a rotation axis, said rotation axis being perpendicular to the working stroke.

15. The buoyant wave energy converting apparatus of claim 14, further comprising a mooring means arranged to tether the buoyant platform to a bed of a body of water; wherein the mooring means is arranged to define a distance between the buoyant platform and the bed of the body of water, said distance being adjustable.

* * * * *